United States Patent
Chen et al.

(10) Patent No.: US 9,606,955 B2
(45) Date of Patent: Mar. 28, 2017

(54) EMBEDDED UNIVERSAL SERIAL BUS SOLUTIONS

(71) Applicant: INTEL CORPORATION, Santa Clara, CA (US)

(72) Inventors: Huimin Chen, Portland, OR (US); Jia Jun Lee, Seberang Jaya (MY); Amit Kumar Srivastava, Penang (MY); Teong Guan T. G. Yew, Bagan Serai (MY); Tim McKee, Portland, OR (US)

(73) Assignee: Intel Corporation, Santa Clara, CA (US)

(*) Notice: Subject to any disclaimer, the term of this patent is extended or adjusted under 35 U.S.C. 154(b) by 399 days.

(21) Appl. No.: 14/457,594

(22) Filed: Aug. 12, 2014

(65) Prior Publication Data

US 2015/0227489 A1    Aug. 13, 2015

Related U.S. Application Data

(60) Provisional application No. 61/937,878, filed on Feb. 10, 2014.

(51) Int. Cl.
    *G06F 13/20*    (2006.01)
    *G06F 13/42*    (2006.01)
    *G06F 13/38*    (2006.01)

(52) U.S. Cl.
    CPC ........ *G06F 13/4291* (2013.01); *G06F 13/385* (2013.01)

(58) Field of Classification Search
    USPC ................. 710/104–110, 305–315
    See application file for complete search history.

(56) References Cited

U.S. PATENT DOCUMENTS

| | | | |
|---|---|---|---|
| 6,973,591 B2 | 12/2005 | Debling | |
| 7,281,069 B2* | 10/2007 | Turner | G06F 13/426 710/105 |
| 7,320,071 B1 | 1/2008 | Friedman et al. | |
| 8,683,091 B2* | 3/2014 | Chen | G06F 11/3051 710/17 |
| 9,201,831 B2* | 12/2015 | Chan | G06F 13/4027 |
| 2008/0028120 A1* | 1/2008 | McLeod | G06F 13/4045 710/313 |
| 2010/0049878 A1 | 2/2010 | Yu et al. | |
| 2012/0059965 A1 | 3/2012 | Foster | |
| 2014/0003473 A1 | 1/2014 | Chen et al. | |
| 2014/0006674 A1 | 1/2014 | Chan et al. | |

FOREIGN PATENT DOCUMENTS

| | | |
|---|---|---|
| TW | 201040739 A | 11/2010 |
| TW | 201041344 A | 11/2011 |
| TW | I1413904 B | 11/2013 |

OTHER PUBLICATIONS

TW Search Report, TW Application No. 104100739, dated Jul. 22, 2016, 1 page.

* cited by examiner

*Primary Examiner* — Raymond Phan
(74) *Attorney, Agent, or Firm* — International IP Law Group, P.L.L.C.

(57) ABSTRACT

Techniques for embedded high speed serial interface methods are described herein. The method includes issuing a single-ended one (SE1) signal on each of a pair of embedded high speed serial interface data lines, the SE1 indicating a register access protocol (RAP) message follows the SE1 signal. The method also includes accessing a register of an embedded high speed serial interface component based on the RAP message.

25 Claims, 26 Drawing Sheets

300A

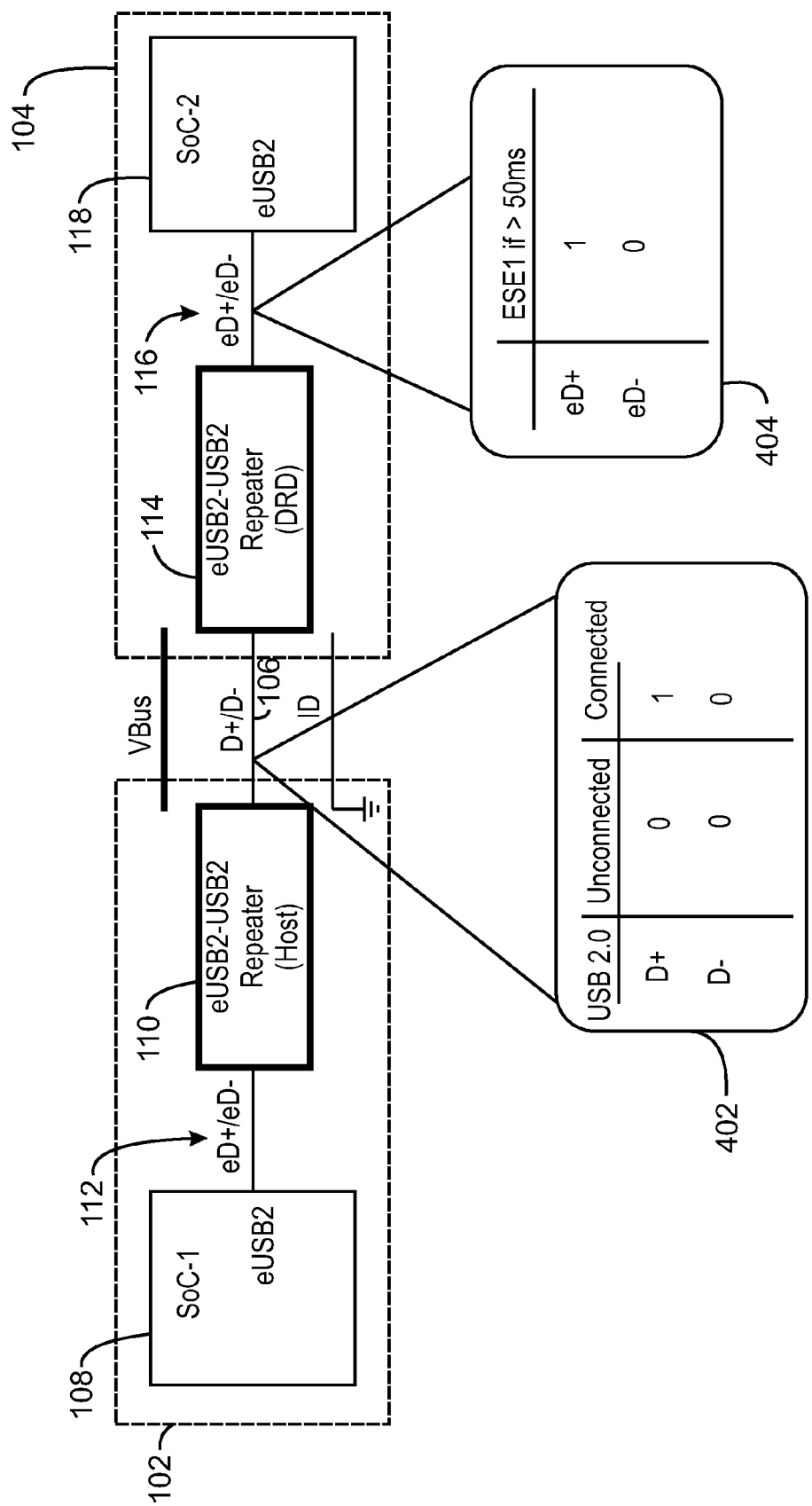

400B

600

1000A

1000B

1500

1600B

1800B

EMBEDDED UNIVERSAL SERIAL BUS SOLUTIONS

CROSS REFERENCE TO RELATED APPLICATIONS

The present application claims priority to U.S. Provisional Patent Application No. 61/937,878, filed Feb. 10, 2014, which is incorporated herein by reference.

TECHNICAL FIELD

This disclosure relates generally to techniques for embedded Universal Serial Bus 2.0 (eUSB2) protocol. Specifically, this disclosure relates to eUSB2 for In-the box application and supports Universal Serial Bus 2.0 (USB2) protocol functionality.

BACKGROUND

In today's semiconductor industry, Universal Serial Bus 2.0 (USB2) protocol is an industry interface developed to standardize communication between a host computer and a peripheral devices communicatively coupled to the host computer. This interface has been widely accepted across multiple applications apart from computer and peripheral device data communication, such as storage communication, Bluetooth communication, touch sensor communication, camera and wireless fidelity (Wifi). A USB2 specification, such as Universal Serial Bus 2.0 Specification includes a supplement standard like battery charging 1.2 (BC 1.2) and On-The-Go 2.0 (OTG 2.0). The USB2 BC 1.2 specification allows devices to draw current (up to 1.5 A) to charge their battery during power on or when battery is weak from a Host, a Hub, a dedicated charger, a charging downstream port, and the like. USB2 OTG 2.0 includes dual role devices (DRD) wherein the devices can be configured as a host as well as a peripheral device. Embedded USB 2.0 (eUSB2) is a next generation low power USB2 for embedded applications and providing USB2 bus communication solutions.

In its present state, eUSB2 does not define signaling for detection of polarity inversion at eUSB2 data lines. While other technologies may employ line code to provide polarity inversion, in eUSB2 line code is not applicable as the eUSB2 employs a non-return-to-zero (NRZ) signaling without line code.

BRIEF DESCRIPTION OF THE DRAWINGS

FIG. 4A illustrates an example diagram of connected devices translating a single-ended one (SE1) to an extended single-ended one (ESE1);

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
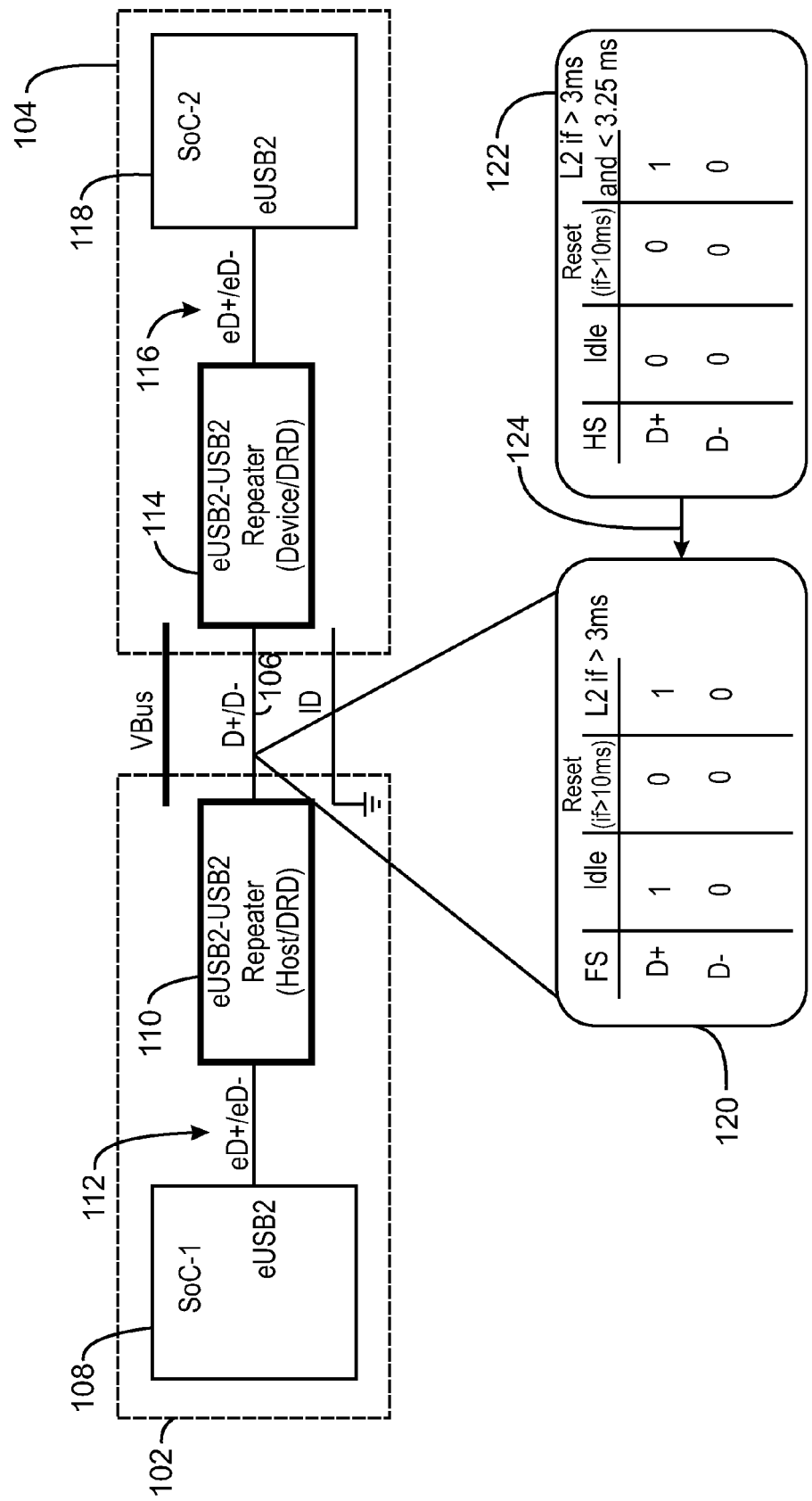
FIG. 1 illustrates a block diagram of a first computing embedded USB2 host and second computing embedded USB2 device to communicate over USB2 bus through an eUSB2-USB2 host/DRD repeater at a host side and an eUSB2-USB2 device/DRD repeater at a device side.

In the aspects discussed below, an embedded high speed serial interface is described. A serial high speed interface may include an embedded Universal Serial Bus (eUSB) as one example. However, other embedded high speed serial interfaces may be used. Accordingly, present disclosure relates generally to techniques related to embedded Universal Serial Bus 2.0 (eUSB2) operations. In embodiments, the present disclosure provides a solution to enable battery charging detections, OTG 2.0 detections, USB2 suspend entry and high speed reset signaling through embedded USB2 in-band communication by retaining USB2 timings. The techniques described herein also provide for in-band communication to read, clear and write registers, line polarity inversion detection, and extended in-band communication to avoid bus conflict.

USB2 protocol describes link power management states (LPM), such as L0 active, L1 sleep, and L2 Suspend. The LPM states describe the status of the bus line between an upstream port of a device and a downstream port of a host. The bus line may also be referred to as a lane, or a line, in this disclosure. Entry and exit into each of the LPM states can be performed using an implicit signaling mechanism based on the duration of link idle time to issue control messages such as Suspend and Reset, or control transfer for L1/L2.

L0, as referred to herein, is an "On" state in which a link between a host and a device is enabled for communication. During this state, a port may be actively transmitting or receiving information through a pair of data lines D+ and D−, and is described as "active". Additionally, the port may have the ability to transmit or receive information through the pair of data lines, but is not transmitting any data over the data lines is described as "idle". During the L0 state, the host is periodically transmitting Start-of-Frame (SOF) packets.

A powered down state includes state L1 and state L2. L1, as referred to herein, is a "Sleep" state in which the link is low power state to reduce power consumption. Exit latency at the L1 state is 70 microseconds (µs) to 1 millisecond (ms) range. Entry to the L1 state is accomplished through a control transfer. Exit from the L1 state is accomplished through communicating a "Resume" operation.

L2, as referred to herein, is a "Suspend" state in which both the link host and the device may enter the low power state to further reduce power consumption. During this state, the link consumes approximately 600 µW of power, while the device power consumption falls within a specified range. Entry to the L2 state occurs implicitly when no activity occurs on the link for 3 milliseconds. Exit from the L2 state is accomplished through Resume.

Each of the L0 state, the L1 state, and the L2 state, is entered and exited using control messages. Traditionally, the entry and exit between the states is accomplished by either implicit signaling or a control transfer. However, for eUSB2, explicit control messages may be used to transition between the various link states.

Reset, as referred to herein, is a control message that sets the device into an unconfigured, default state so that the host can communicate with the device. Resume, as referred to herein, is a control message that brings the device from an idle state to an active (L0).

If the device is operating at Low-Speed, or a data rate of 1.5 Mbit/s, the host can also periodically transmit "Keep Alive" control messages to prevent the link from entering the L2 state, as described below.

USB2 Bus Reset and Suspend Mechanism Using eUSB2 with Dual Role Redriver

In one embodiment, an in-band approach for an eUSB2 upstream port to direct its peripheral repeater to differentiate between L2 entry and USB2 bus reset during HS operation is described. In the embodiments described herein, a handshake with existing USB2 pins (without having to add additional sideband signaling) is described herein, while maintaining an USB2 timing according to USB2 specification. A control message, specifically CM.Zero, is defined to not only allow an upstream port to direct a peripheral repeater to begin sampling USB2 line state but also to enable the peripheral repeater to respond back to the upstream port on detected USB2 state from the downstream port. In embodiments, a peripheral repeater is a component of a peripheral device including the downstream port, while the upstream port is a host device. The peripheral device may also be a dual-role device wherein when connected to other peripheral devices the peripheral device acts as a host device, or an upstream port. The upstream port initiated messages simplifies peripheral repeater architecture and yet maintains backward compatibility to USB2 suspend and port reset timing.

FIG. 1 illustrates a block diagram of a first computing embedded USB2 host and second computing embedded USB2 device to communicate over USB2 bus through an eUSB2-USB2 host/DRD repeater at a host side and an eUSB2-USB2 device/DRD repeater at a device side. A first computing device 102 may be communicatively coupled to a second computing device 104 via a legacy USB protocol, as indicated by the line 106. The first computing device may include a first eUSB2 port 108 and an embedded USB 2.0 (eUSB2) repeater 110. In embodiments, the first eUSB2 port 108 may be a System on a Chip (SoC) having logic and an eUSB2 transceiver to perform operations according to eUSB2 protocol. The eUSB2 protocol may be configured to receive data signals associated with legacy USB protocols. In this scenario, the eUSB2 repeater 110 is configured to translate commands between legacy USB protocols received at 106 and eUSB2 protocol communications propagating over eD+/eD− data lines indicated at 112, 116.

In eUSB2 protocol, the first computing device 102 may be considered a host computing device, and the first USB port 108 may be referred to herein as an upstream USB port. The second computing device 104 may include an eUSB2 repeater 114. Similar to the eUSB2 repeater 110, the eUSB2 repeater 114 may translate commands between legacy USB protocols 106 and eUSB2 protocol communications propagating over eD+/eD− data lines of the device side as indicated at 116. The second computing device 104 may include a second eUSB2 port 118 configured to communicate with the eUSB2 repeater 114 via eUSB2 protocol.

In the example illustrated in FIG. 1, the second computing device 104 may be referred to as a peripheral device when compared to the first computing device 102. In this scenario, the eUSB2 port 118 may be referred to herein as a downstream port. In this example, the first computing device 102 and the second computing device 104 may both include respective eUSB2 repeaters 110, 114. However, communication between the first computing device 102 and the second computing device 104 may be provided by legacy USB operations, such as USB 2.0 (USB2) via the data positive (D+) and data negative (D−) lines indicated at 106.

USB2 offers three different transfer rates: a Low Speed (LS) of about 1.5 megabits per second, a full speed (FS) of about 12 megabits per second, and a high speed (HS) of about 480 megabits per second. As indicated at 120 and 122, in each transfer rate, the values of each data line may indicate a different state. For example, in the FS data transfer rate, an idle state may be communicated by the D+ data line having a value of 1, and a D− data line having a value of 0. If the values of 1 and 0 at the D+/D− data lines 106 persist for time period more than, or equal to, 3 milliseconds, then the second computing device 104 may interpret the values as indicating a suspend state, indicated by L2 in the box 120 according to legacy USB protocol.

In contrast to FS data transfer rate, the eUSB2 protocol communications may include the HS data transfers wherein the values of each data line may indicate a different state, as indicated at 122, which are different than the values for states in the FS data transfer rate indicated at 120. In HS the idle state may be indicated by a value of 0 at the D+ data line and a value of 0 at the D− data line, otherwise known as a single-ended "0" (SE0). Suspend may be also be indicated by SE0 that persists for a time period of at least 3 milliseconds. However, if the SE0 persists for more than 3 milliseconds and less than 3.25 milliseconds, then the eUSB2 protocol may determine that a suspend state, otherwise known as a L2, state exists. Reset may also be indicated by SE0 that persists up to 10 milliseconds. Between 3 milliseconds and 3.25 milliseconds, a repeater, such as the eUSB2 repeater 114 of the second computing device 104, upstream from the computing device 102, may carry out operations to distinguish between the L2 state and the reset state in HS eUSB2 protocol.

To distinguish between the L2 state and the reset state in the HS embedded USB protocol, the peripheral device 104 may eliminate voltage pull downs existing at the eUSB2 repeater 114. The elimination of pull downs existing at the eUSB2 repeater 114 enables data provided on the D+/D− data lines 106 to be viewed by the eUSB2 repeater 114 in the FS state by enabling a FS voltage pull-up (1.5 kilaohm). In HS operation, the entry to a standby state (L2) is detected by a USB2 device switching from HS to FS upon detecting idle state (SE0) for 3 milliseconds, as indicated by the arrow 124.

Figure 2:
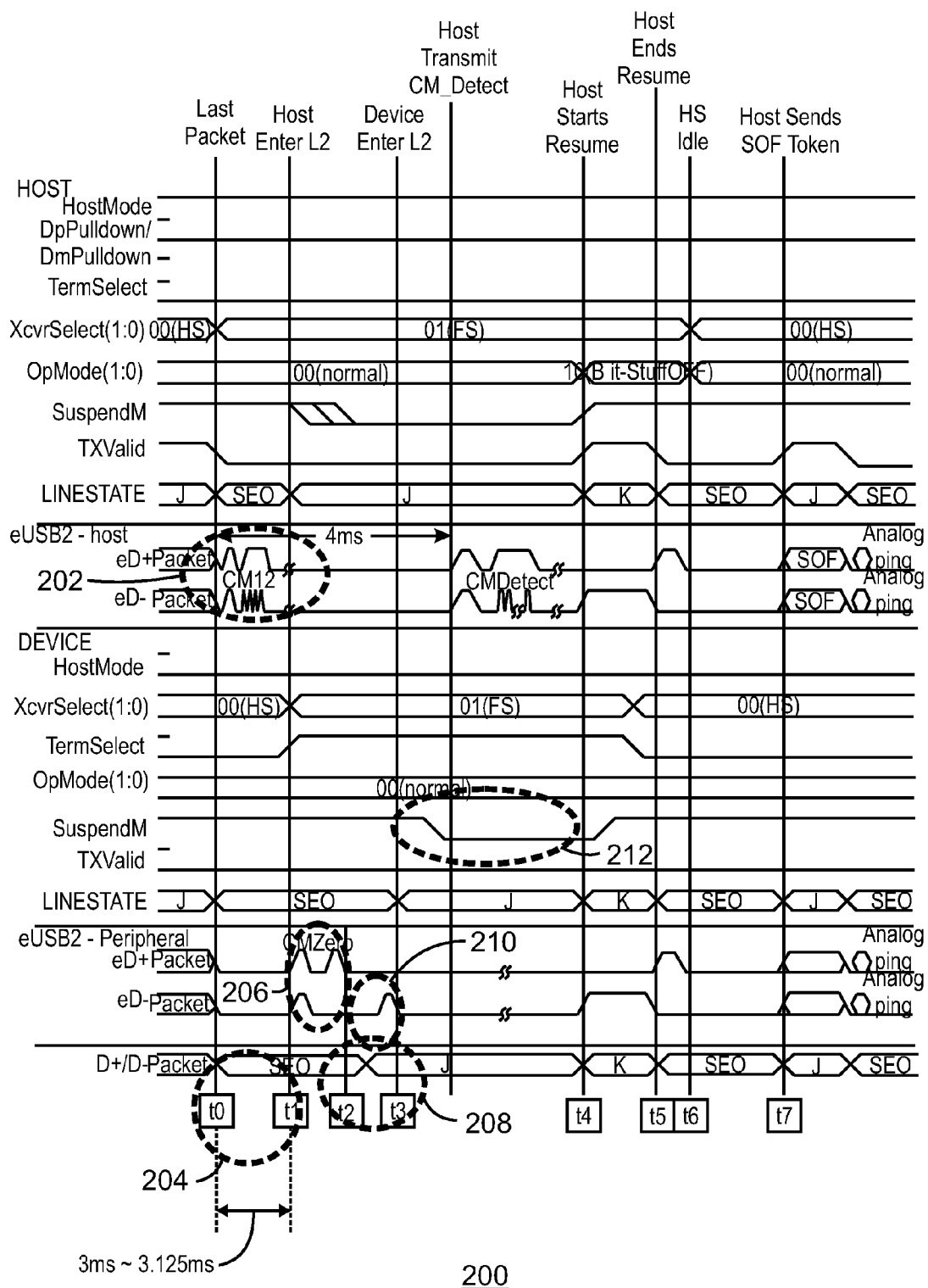
FIG. 2 is a signaling diagram illustrating an embedded USB2 upstream port directing a peripheral repeater to enter a suspend state.

FIG. 2 is a signaling diagram illustrating an embedded USB2 upstream port directing a peripheral repeater to enter a suspend state. Downstream ports, such as the eUSB2 port 118 of FIG. 1, distinguish between HS reset and suspend (L2) commands from an upstream port, such as the eUSB2 port 108. A command message (CM), such as CM.L2 at 202 of FIG. 2 is defined specifically for an eUSB2 upstream port to direct its peripheral repeater to differentiate between L2 entry and USB2 bus reset when in high speed (HS) operation. As discussed above, in HS operation, the entry to a standby state (L2) is detected by a USB2 device switching from HS to FS upon detecting SE0 idle for 3 milliseconds.

To facilitate the differentiation between L2 entry and USB2 bus reset, an eUSB2 upstream port and its associate peripheral repeater shall determine whether the link idle has persisted for at least 3 milliseconds, as indicated at 204. Upon detecting link idle for 3 milliseconds, an eUSB2 upstream port shall transmit CM.Zero to its peripheral repeater within 125 microseconds, as indicate at 206. Upon receiving CM.Zero, an eUSB2 peripheral repeater of the upstream port shall switch its transceivers from HS to FS by removing a pull down at the eUSB2 peripheral repeater, and then sample the line state. If it has detected the line state changed from SE0 to J as indicated by 208, it shall transmit a digital ping at eD− within 50 microseconds upon detecting CM.Zero, as illustrated at 210. If it has detected the line state didn't change to SE0, it shall remain in J state, as illustrated at 208. Further, the eUSB2 upstream port, upon issuing CM.Zero, shall sample eD− within 100 us. If it has detected the digital ping at eD−, it shall declare the entry to L2, as illustrated in 212.

Figure 3A:
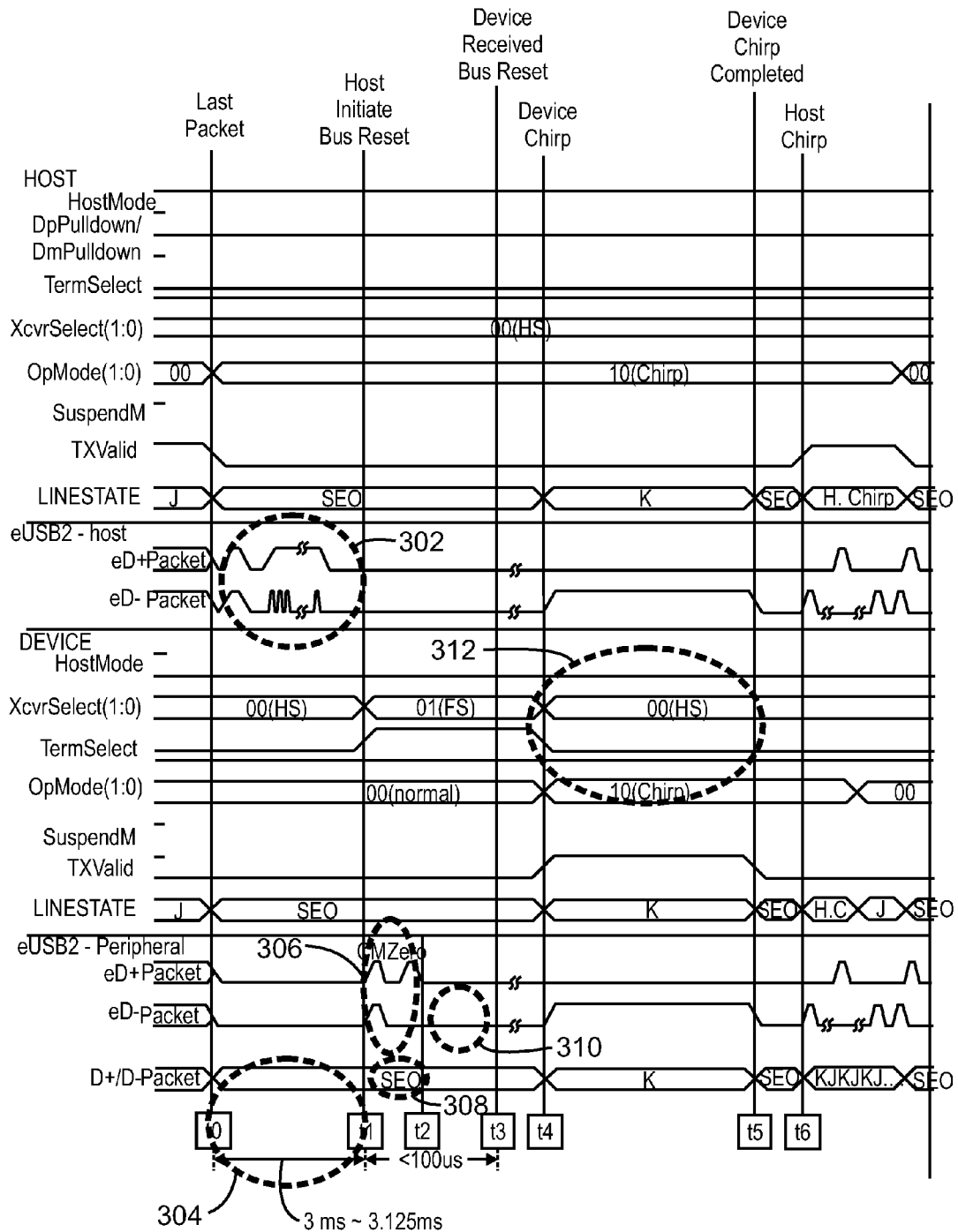
FIG. 3A is a signaling diagram illustrating an embedded USB2 upstream port directing a peripheral repeater for reset state detection.

FIG. 3A is a signaling diagram illustrating an embedded USB2 upstream port directing a peripheral repeater for reset state detection. A control message (CM), such as CM.reset at 302 of FIG. 3, may be the same CM 202 FIG. 2, is defined specifically for an eUSB2 upstream port to direct its peripheral repeater to differentiate between L2 entry and USB2 bus reset when in high speed (HS) operation. Similar to FIG. 2, an eUSB2 upstream port and its associated peripheral repeater shall determine whether the link idle has persisted for at least 3 milliseconds, as indicated at 304. Upon detecting link idle for 3 milliseconds, an eUSB2 upstream port shall transmit CM.Zero to its peripheral repeater within 125 microseconds, as indicated at 306. In contrast to FIG. 2, the line state has not changed from SE0 to J as indicated by 308, and therefore no digital ping is transmitted as indicated at 310. The eUSB2 upstream port, when sampling the eD− within 100 milliseconds of issuing a CM.Zero, will not detect a digital ping, as indicated at 312, and will declare a bus reset has been detected.

Figure 3B:
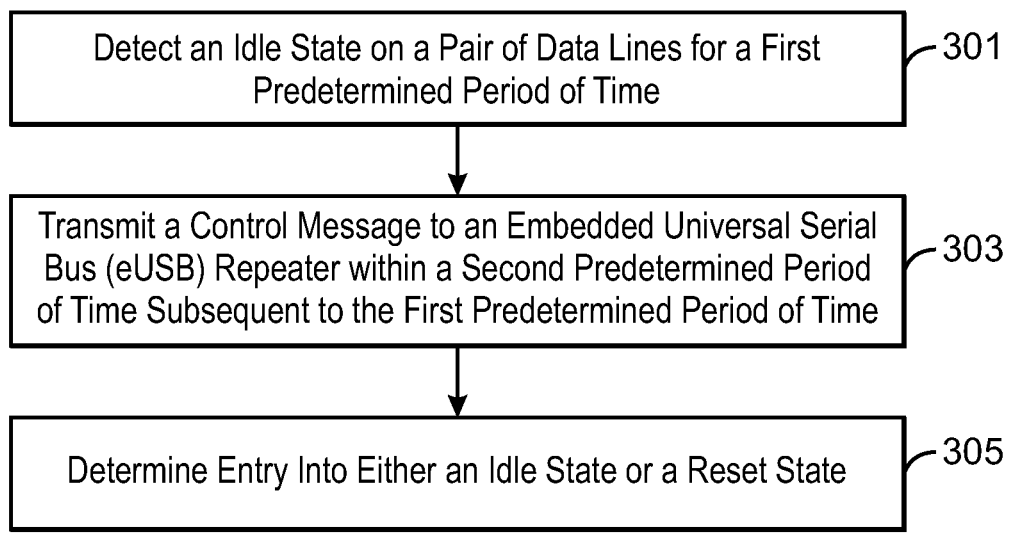
FIG. 3B is a block diagram illustrating a method for explicit control message signaling.

FIG. 3B is a block diagram illustrating a method for explicit control message signaling. As illustrated in FIG. 3B, the method may include detecting an idle state on a pair of data lines for a first predetermined period, as indicated at block 301. At block 303, a control message is transmitted to an eUSB repeater within a second predetermined period of time. The second predetermined period is to be subsequent to the first predetermined period of time. At block 305, entry into either an idle state or a resent state is determined.

FIG. 3B is an exemplary illustration of the techniques described herein. However, more or less elements of the method illustrated may be included, or deleted.

ESE1 Signaling for Soft Connect and Disconnect Presence Announcement.

The embodiments described herein include an extended single ended one (ESE1) mechanism for indicating disconnect, connect, re-connect, and reset announcements to devices using embedded Universal Serial Bus 2.0 (eUSB2). A traditional single ended one (SE1) is a value recognized in legacy USB protocols, such as USB 2.0 (USB2), indicating a connection or disconnection between two devices. In eUSB2, SE1 may be translated by an eUSB2 repeater to an ESE1. The ESE1 will provide an SE1 signal for an extended period of time such that other contending signals may be overwritten due to the length of the SE1 signal.

FIG. 4A illustrates an example diagram of connected devices translating a single-ended one (SE1) to an extended single-ended one (ESE1). The connected devices may be the first computing device 102 and the second computing device 104 discussed above in reference to FIG. 1. As discussed above, the first computing device 102 may be communicatively coupled to a second computing device 104 via a legacy USB protocol, such as USB 2.0, as indicated by the line 106. In USB 2.0 protocol, a connect and disconnect state may be indicated by values on the D+/D− lines as indicated by the box 402. Specifically, in the USB2 protocol, an unconnected state may be indicated by a value of 0 on both the D+ and D− lines 106. When the second computing device 104 is connected to the first computing device 102, the D+ data line may be pulled up to a value of 1, while the D− data line remains zero. This value of 1 on the D+ data line and of 0 on the D− data line will indicate to the first computing device 102 that a device is connected according to the USB 2.0 protocol. However, the value of 1 on the D+ data line is a result of a voltage pull up being implemented at the USB2 interface of the second computing device 102.

The pull up implemented at the USB 2.0 interface to indicate a connected state may consume power. Embodiments described herein implement an extended SE1 (ESE1) to indicate connected states and disconnected states, as indicated at the box 404. Specifically, the ESE1 is an SE1 signal provided for at least 30 milliseconds and a maximum of 50 milliseconds.

A port shall monitor the line state at the eD+/eD− lines before attempting an ESE1 transmission. For example, the upstream port 108 of the first computing device may determine the line state of the eD+/eD− data lines 112. In embodiments, the ESE1 includes a time domain that is long enough to override contending signals. For example, when directed, the upstream port 108 may transmit ESE1 regardless of the state of an downstream port, such as the downstream port 118, or even the eUSB2 repeater 110. The ports 108 and 118 may include logic, at least partially including hardware logic to carry out the ESE1 signaling operations discussed herein.

In some embodiments, a port, such as the upstream port 108, may transmit ESE1 to initialize a recovery operation to resolve an unrecognizable eUSB2 event. For example, some circumstances may occur where an unexpected, or undeterminable, condition is detected, such as a downstream device fault or hang. In this scenario, the upstream port 108 may transmit an ESE1 as an attempt to terminate the current USB session with the downstream port 118 and start a new USB session. In some embodiments, a port attempting to terminate a current USB session, may attempt termination via sending ESE1 no more than three times. If the upstream port 108 fails to establish an USB session on the third retry, the upstream port 108 shall disable the downstream port 118 and the downstream port 118 shall enter a suspend state.

In operation, the upstream port 108 shall transmit an ESE1 upon power on or when directed to start a new USB session with the second computing device 104. In embodiments, this may be referred to as a upstream port (DSP) reset announcement.

The downstream port 118 shall transmit an ESE1 upon power on or when directed to perform a soft connect. A soft connect, as referred herein, is an operation performing a logical communicative coupling between a computing device and another computing device. For example, if the first computing device 102 may be physically connected to the second computing device, but not logically and communicatively coupled. In some embodiments, a logical communicatively coupling includes an electrical coupling such that the upstream port 108 recognizes that the downstream port 118 is connected. In examples, when the downstream port 118 transmits an ESE1 upon power on, or upon a soft connect, it may be referred to as an upstream port (USP) announcement.

In embodiments, the upstream port 118 may transmit an ESE1 if directed to perform a soft disconnect, or upon a host repeater, such as the eUSB2 repeater 110, detecting an USB 2.0 device disconnect. Similar to a soft connect, a soft disconnect refers to a logical communicative decoupling of a device from another device. In examples, when the downstream port 118 transmits an ESE1 upon detecting either a soft disconnect or an USB 2.0 device disconnect, it may be referred to herein as a device disconnect announcement. In some scenarios, the device disconnect announcement may be sent to the upstream port 108. For example, upon detection of a USB 2.0 device disconnect, the eUSB2 repeater 110 may transmit an ESE1 to the upstream port 108.

In embodiments, a host repeater, such as the eUSB2 repeater 110, may transmit an ESE1 upon power up of the host repeater 110. In examples, this may be referred to herein as a repeater presence announcement.

In embodiments, a peripheral repeater, such as the eUSB2 repeater 114, transmits an ESE1 under certain conditions. For example, upon power up of the eUSB2 repeater 114, an ESE1 may be transmitted from the eUSB2 repeater 114 to the downstream port 118. When upon power up the eUSB2 repeater 114 transmits an ESE1 to the downstream port 118, it may be referred to herein as the repeater presence announcement discussed above. In another example, upon detection of a host disconnect, such as a disconnection of the first computing device 102 from the second computing device 104 based on a de-assertion of a peripheral port, such as the downstream port 118. This scenario may apply to a bottom up repeater configuration, and may be referred to herein as a host disconnect announcement.

In embodiments, a port, such as ports 108 or 118, detects an SE1 at an eUSB2 bus, such as the eUSB2 repeaters 110, 114, declares the reception of ESE1 if the SE1 duration is more than 50 milliseconds. In some embodiments, a current ESE1 may concurrently exist. Under this condition, the conclusion of ESE1 may be asynchronous. If the port concludes a prior ESE1 earlier, then the port may drive SE0 before enabling a pull down, and contention may occur between SE0 and ESE1. In this scenario, the port may be directed to ignore the SE1 discontinuity.

In embodiments, upon declaring an ESE1 reception, a port, such as one or more of the ports 108, 118, may transition to, or remain in, a power on state, and prepare to start a new USB session. For example, the upstream port 108 may declare an ESE1 reception. Upon declaration of an ESE1 reception, the upstream port 108 may transition to, or remain in a power on state occurring before the reception of the ESE1.

Figure 4B:
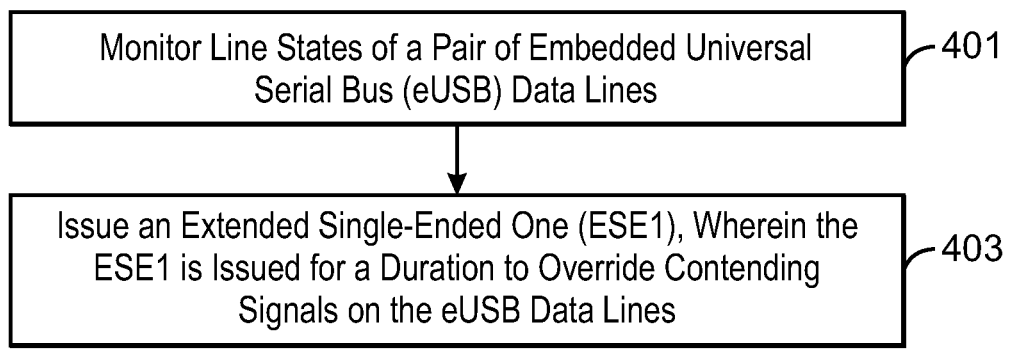
FIG. 4B is a block diagram illustrating a method for explicit control message signaling.

FIG. 4B is a block diagram illustrating a method for explicit control message signaling. As illustrated in FIG. 4B, the method may include monitoring line states of a pair of embedded Universal Serial Bus (eUSB) data lines, as indicated at block 401. At block 403, an extended single-ended one (ESE1) is issued. The ESE1 is issued for a duration to override contending signals on the eUSB data lines.

FIG. 4B is an exemplary illustration of the techniques described herein. However, more or less elements of the method illustrated may be included, or deleted.

Method and Apparatus of a Register Access Protocol for eUSB2.

USB2 utilizes the Link Power Management (LPM) system to issue control messages. This system defines an implicit signaling mechanism for the host to issue a control message (such as Suspend or Reset) based on the duration of a link idle time, or a control transfer for entry to L1. The methods and systems disclosed herein relate to an explicit control message (CM) of control messaging protocol. More specifically, a low-cost and low-power explicit control signaling for Universal Serial Bus 2.0 (USB2) and similar protocols is disclosed.

According to embodiments of the subject matter described herein, a pair of single-ended logic '1' (SE1) signals are used during embedded USB 2.0 (eUSB2) operations to issue control messages. An eUSB2 protocol is an input/output (I/O) solution that reduces the voltage cost and power consumption of USB 2.0 interfaces. The eUSB2 uses 1.0 Volt (V) digital signaling rather than the 3.3 Volt analog signal in USB 2.0 Low-Speed (LS) and Full-Speed (FS) operations. Additionally, eUSB2 uses a 0.2 V differential signaling instead of the 0.4 V differential signaling for USB 2 High-Speed (HS) interfaces. Due to the differences in the signal strength of USB2 and eUSB2, an eUSB2 repeater may be used as an electrical bridging solution to ensure that USB2 and eUSB2 components and associated protocols and messaging are compatible with one another.

USB2 employs two distinct methods to deliver a control message from a Host to a device to reset a device (Reset), or L1/Suspend to transition the link and/or a device to be in a low power Suspend state. In transmitting Reset or Suspend, USB2 uses implicit signaling measured by the duration of link in idle represented by SE0. In transitioning a link to L1, a control transfer is employed. Thus, the control messages in standard USB2 need to be detected by a device either using a timer to measure the duration of link idle, or decoding a control transfer.

As described above, a repeater may be used to ensure compatibility between the conventional USB2 solution and the eUSB2 solution. In some scenarios, a repeater may include a register associated with the repeater. The register may be a memory device, such as a non-transitory computer readable medium. In embodiments, the register enables another component, such an eUSB2 port, to identify the repeater. In some cases, a port may write to the register, read the register, clear the register, or any combination thereof. However, in previous solutions, a side band communicative coupling was used to communicate between the register and the port. The embodiments described herein include an in-band control message configured to notify a repeater that subsequent communications following the control message are related to register access protocol (RAP). An in-band control message, as referred to herein, is a control message provided via the eUSB2 or USB data lines. Further, in native mode, wherein a first eUSB2 port is connected to a second eUSB2 port directly as opposed to an eUSB2 port connected to another component via legacy USB2 protocol, a downstream eUSB2 port may access register space in an upstream eUSB2 port.

Figure 5:
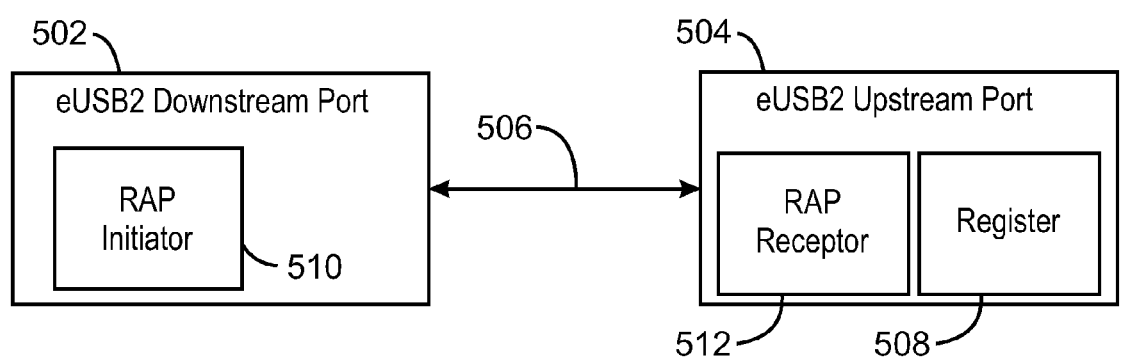
FIG. 5 illustrates an example diagram of communicatively coupled eUSB2 ports for enabling register access protocol.

FIG. 5 illustrates an example diagram of communicatively coupled eUSB2 ports for enabling register access protocol. A downstream eUSB2 port 502 may be communicatively coupled to an upstream eUSB2 port 504, as indicated by the line 506. In embodiments, the communicative coupling 506 may be an eUSB2 coupling using eD+ and eD− data lines without legacy USB protocol data lines such as D+ and D−. This scenario, wherein two eUSB2 ports 502, 504 are coupled without legacy USB2 protocol coupling in between the two eUSB2 ports 502, 504, may be referred to herein as native mode.

The upstream eUSB2 port 504 may include a register 508. The register 508 may be accessed by the downstream eUSB2 port 502 via an in-band control message. An "in-band" control message, as referred to herein includes a control message propagated over eD+ and eD− data lines, as opposed to "out-of-band" messages propagating on signal lines external to the eD+ and eD− data lines.

The in-band control message may propagate over the eD+ and eD− data lines of the communicative coupling 506. For example, the control message, when received at the upstream eUSB2 port 504, may notify the upstream eUSB2 port 504 that subsequent communications include RAP communications. In embodiments, the RAP communications may enable the eD+ data line to be used as a clock, and the eD− data line to be used for transmitting write instructions, read instructs, clear instructions, and the like.

The downstream eUSB2 port 502 may include a RAP initiator 510. The RAP initiator may communicate with a RAP receptor 512 at the eUSB2 upstream port 504 to communicate RAP operations in native mode. The RAP initiator 510 is enabled to communicate via RAP such that the RAP initiator 510 can access the RAP receptor 512. The RAP receptor 512 may have access to the register 508, and may have RAP communications defined such that operations may be performed by the RAP communication to the register 508, such as configuration, status read, device identification, and the like.

Figure 6:
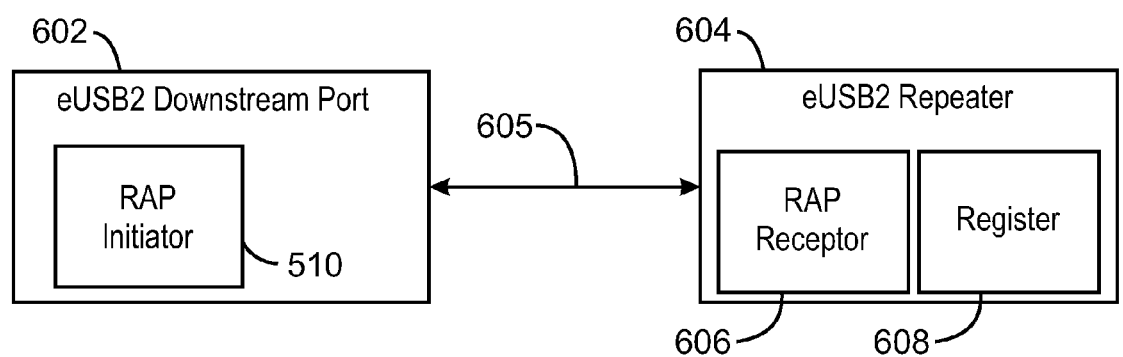
FIG. 6 illustrates an example diagram of an eUSB2 port communicatively coupled to an eUSB2 repeater.

FIG. 6 illustrates an example diagram of an eUSB2 port communicatively coupled to an eUSB2 repeater. A downstream eUSB2 port 602 may be communicatively coupled to an associated eUSB2 repeater 604 via a communicative coupling 605. The communicative coupling 605 may be an eUSB2 coupling using eD+ and eD− data lines without legacy USB protocol data lines such as D+ and D−. As discussed above in regard to FIG. 5, this eUSB2 coupling 605 is a native mode coupling.

Similar to the downstream eUSB2 port 502 discussed above in regard to FIG. 5, the downstream eUSB2 port 602 may include the RAP initiator 510 configured to initiate RAP communications via a control message received at a RAP receptor 606 of the eUSB2 repeater 604. The eUSB2 repeater 604 may include a register 608. The downstream eUSB2 port 602 may access the register 608 of the eUSB2 repeater 604 through an in-band RAP control message sent via the communicative coupling 605.

Although not illustrated in FIG. 5 or FIG. 6, a RAP initiator may be implemented in a downstream eUSB2 port, such as the port 502 of FIG. 5, or the port 602 of FIG. 6, to communicate with a register of a peripherally attached device. As discussed above in regard to FIG. 1 and FIG. 4, a peripheral device may include a repeater and an upstream port. In this scenario, the repeater of the peripheral device may include a register, wherein a RAP initiator of a downstream port may access the register of the upstream port's repeater via a RAP receptor of the upstream port's repeater.

In embodiments, any control message (CM) may be allocated to indicate a RAP operation. As discussed above, a designated CM may denote to a RAP receptor that subsequent operations will be related to RAP. In embodiments, a CM definition may include an allocation of a given CM such that a non-USB operation, such as the RAP operations discussed above, are carried by a USB bus. In embodiments, non-USB operations including read, write, and clear are implemented in device configuration, status reads, device identification, and the like.

In some cases, a given eUSB2 device may be configured to include different functions. In order to switch from one function to another function, a host port, such as the downstream port 502 or 602 discussed above in reference to FIG. 5 and FIG. 6, may direct another device, such as the upstream port 504 or the eUSB2 repeater 604, to switch functions. For example, the downstream eUSB2 port 502 can configure the upstream eUSB2 port 504 for firmware updates. In this example, the downstream eUSB2 port 502 directs the upstream eUSB2 port 504 to enter a suspend state, and then transfers firmware updates to be written to the register 508 the upstream eUSB2 port 504 in FIG. 5. Once the register 508 is configured, the upstream eUSB2 port 504 may reboot, transmit ESE1, and indicate to the downstream eUSB2 port 502 that the upstream eUSB2 port 504 is in a firmware mode enabling firmware to be updated.

Figure 7:
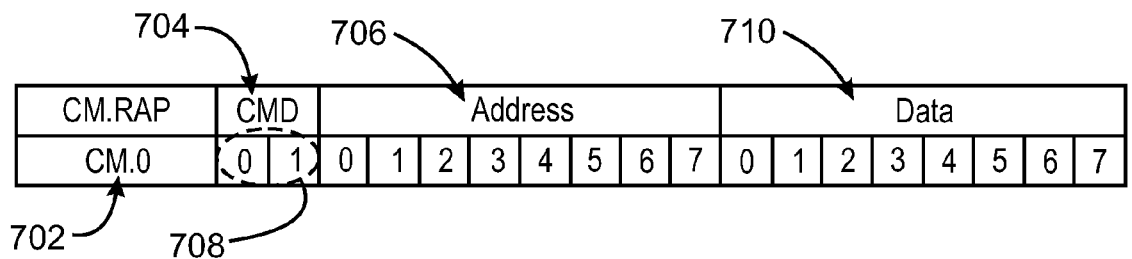
FIG. 7 illustrates an example format of register access protocol transmission.

FIG. 7 illustrates an example format of register access protocol transmission. As indicated at 702, the RAP begins with a dedicated control message (CM). For example, the control message may be a CM.Zero (CM.0) control message. The control message 702 is used to indicate to an eUSB2 device (such as the eUSB2 upstream port 504 of FIG. 5, or an eUSB2 repeater (such as the eUSB2 repeater 604 of FIG. 6), that a RAP initiator (such as the RAP initiator 510 of FIG. 5 and FIG. 6), is addressing a RAP receptor (such as the RAP receptors 508, 606 of FIG. 5 and FIG. 6, respectively). Following the control message 702, a clock is forwarded along with a command, indicated at 704 as well as a register address, indicated at 706. The register address 706 is the address of a register upon which it the control message is configured to operate. The command is a two bit command (CMD) indicating a clock for different register operations, such as read, write, clear, and set. In the example illustrated in FIG. 7, the CMD is indicated by 0, 1 at 708. The data associated with the RAP communication is indicated at 710.

Figure 8A:
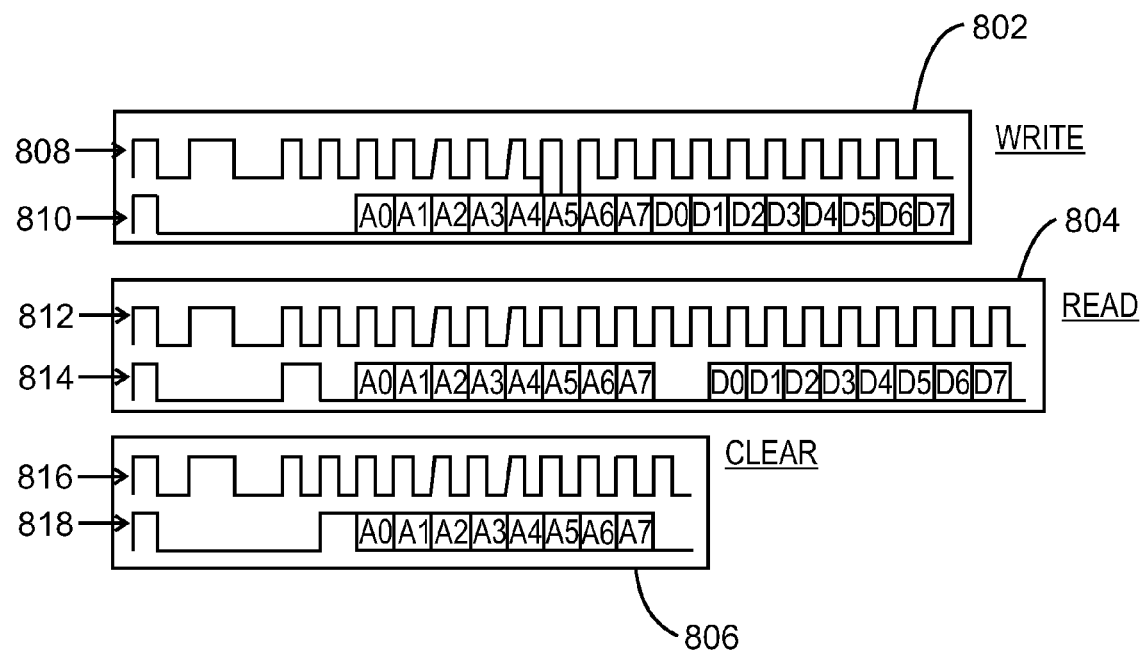
FIG. 8A is a diagram illustrating read, write, and clear signal formatting of RAP operations.

FIG. 8A is a diagram illustrating read, write, and clear signal formatting of RAP operations. As discussed above, different register operations may be performed including a write operation 802, a read operation 804, a clear operation 806, and the like. The write operation 802 may include a clock on the eD+ data line generally indicated by 808, as well as data to be written on the eD− data line generally indicated at 810. The read operation 804 may include a clock on the eD+ data line generally indicated at 812, and data to be read on the eD− data line generally indicated at 814. The clear operation 806 may include a clock signal on the eD+ data line generally indicated at 816, and the addresses to be cleared on the eD− data line generally indicated at 818.

Following a command message, such as CM.Zero discussed above in reference to FIG. 7, the RAP initiator 510 drives a clock, a clock CMD, and an address using the rising edge of the clock. In a write operation 802, the data may follow immediately after the address. A RAP receptor, such as the RAP receptors 508 and 606, upon detecting CM.Zero, use the forwarded clock to sample CMD, address, and write data, based on the falling edge. In a read operation 804, the RAP receptor such as RAP receptors 508, 606, may use the falling edge of the clock to read data back to the RAP initiator 510. In a clear operation 806, the RAP receptor such as RAP receptors 508, 606, may use the rising edge to identify addresses to clear in a register, such as one or more of the registers 508 and 608. A RAP initiator may perform RAP operations at any time as long as it is able to avoid contention with USB2 traffic.

In embodiments, the RAP operations, such as RAP operations 802, 804, 806, are communicated in one clock cycle. However, in some embodiments, implementations include RAP operations including more than one clock cycle. Further, although specific clock formats are illustrated in FIG. 8 as an example, other clock cycles are contemplated.

Figure 8B:
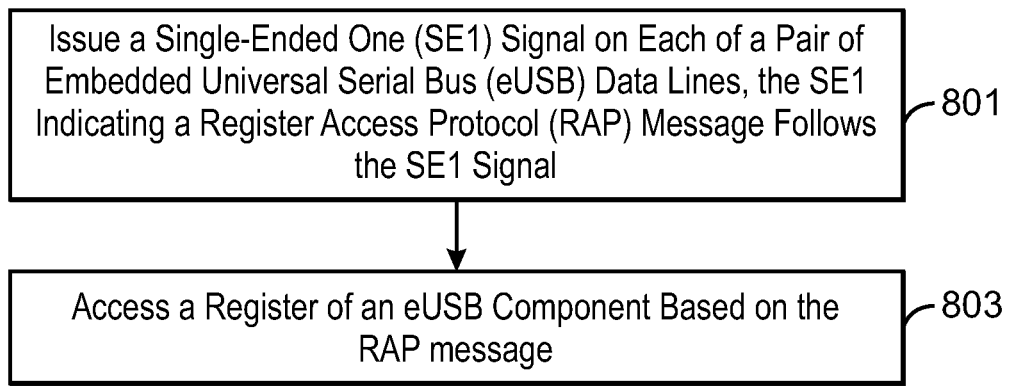
FIG. 8B is a block diagram illustrating a method for explicit control message signaling.

FIG. 8B is a block diagram illustrating a method for explicit control message signaling. As illustrated in FIG. 8B, the method may include issuing a single-ended one (SE1) signal on each of a pair of embedded Universal Serial Bus (eUSB) data lines, the SE1 indicating a register access protocol (RAP) message follows the SE1 signal, as indicated at block 801. At block 803, accessing a register of an eUSB component based on the RAP message.

FIG. 8B is an exemplary illustration of the techniques described herein. However, more or less elements of the method illustrated may be included, or deleted.

Apparatus to Tolerate Intra Pair Skew During HS Mode for eUSB2 Application.

An embedded USB Host communicates control messages to an eUSB2 receiving device. Examples of a control message include a reset control message, a suspend control message, a resume control message, and the like. Control messages are single-ended signals. In embodiments, when a control message is sent via an eD+ data line and an eD− data line, a voltage difference between the lines may be due to skew between data lines caused by channel impairment, such as a trace mismatch on a printed circuit board (PCB) between differential data lines, a circuit mismatch, such as a systematic mismatch between eD+ data line transceiver and eD− transceiver, a clock path mismatch, and the like.

Skew, as referred to herein, may be a magnitude of a time difference between two events which are meant to occur at the same time. The skew may be misinterpreted as a differential signal, such as a differential data signal at the receiving device. The embodiments described herein include a mechanism for differentiating a control message from a differential signal, wherein ambiguity between a control message and a differential signal is due to an intra-pair skew between eD+ and eD− lines.

Figure 9:
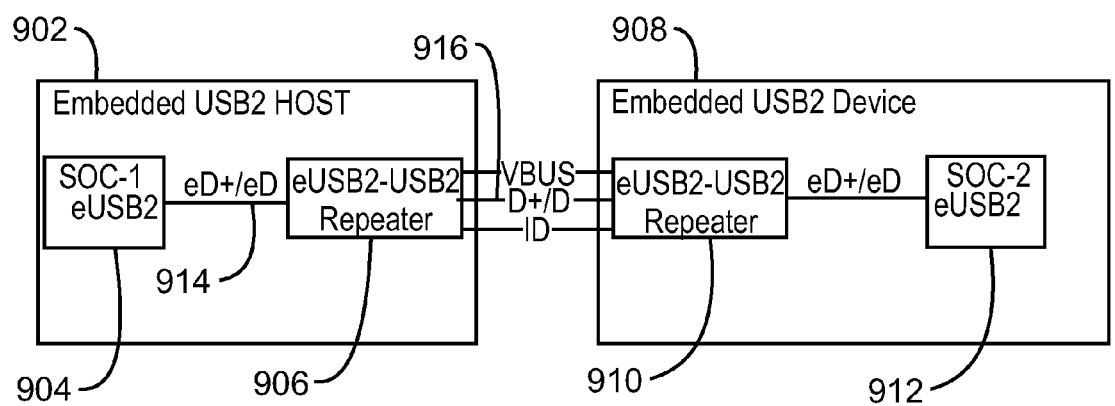
FIG. 9 is a block diagram illustrating an embedded USB2 (eUSB2) host communicatively coupled to an embedded USB2 (eUSB2) device through an embedded USB2 (eUSB2) repeater at host and device side respectively.

FIG. 9 is a block diagram illustrating an embedded USB2 (eUSB2) host communicatively coupled to an embedded USB2 (eUSB2) device through an embedded USB2 (eUSB2) repeater at host and device side respectively. The eUSB2 host 902 includes a system-on-chip 904 implementing a eUSB2 protocol. In embodiments, the system-on-chip implementing eUSB2 protocol may be referred herein as a downstream eUSB2 port 904. The eUSB2 host 902 may include an eUSB2 repeater 906 configured to communicate with an eUSB2 device 908 having an eUSB2 repeater 910 and a system-on-chip eUSB2 upstream port 912. The eUSB2 host 902 may communicate with the eUSB2 device 908 via legacy USB protocol, such as USB2 protocol.

In embodiments, the eUSB2 repeater 906 may include a squelch detector (not shown). As discussed in more detail below, the squelch detector may be a circuit function that acts to suppress signals below a threshold voltage. A typical squelch detector may operate in differential signaling modes, such as a high speed (HS) mode. However, a single ended control message may be transmitted when a repeater, such as the repeater 906 in FIG. 9, is in HS mode. In HS idle mode, a squelch receiver is enabled so that any activity on eUSB2 data lines 914 having a differential voltage more than 100 millivolt (mV) may be detected. When a squelch detector indicates eUSB2 data received is valid (>100 mV differential), the repeater side of an eUSB2 transceiver forwards the data to D+/D− lines 916 once it's received from eD+/eD− data lines 914. In this scenario, when multiple control messages are being transmitted, a skew may be generated such that a voltage pulse associated with the multiple control messages is misconceived by the squelch detector. In some scenarios, the squelch detector may misinterpret control messages on the eD+ and eD− data lines as a differential transmission triggering an exit from the squelch detector, and forwarding the a pulse further on toward a USB bus. In some scenarios, the pulse resulting from multiple single ended control messages may result in the repeater ending HS operation.

In embodiments, skew may cause one of the false conditions at the eUSB2 repeater. In HS idle mode, if eD+ leads or lags as compared to eD−, this condition may cause differential voltage to be developed across eD+/eD− data lines 914 which can be at least 1V and sufficient to trigger the squelch detector. A control signal of the squelch detector may also enable an HS receiver buffer at eUSB2 data lines 914 and enable high speed transceiver at USB2 data lines 916. A failure to squelch command messages, such as when the voltage differential between eD+ and eD− is greater than 100 millivolt as a result of the command messages, during HS idle may cause HS repeater to transmit HS "K" (differential 0) state or "J" (differential 1) on USB2 D+/D− lines 916, to a device side. In this scenario, a contention or conflict may occur at the eUSB2 device 908.

In some scenarios, a rising edge of eD+ precedes the rising edge of eD−. In this scenario, a signaling may be presented at the eUSB2 port 912 as a low speed (LS) keep-alive condition in LS operation. In some scenarios, the rising edge of eD− proceeds the rising edge of eD+. In this scenario, signaling may be presented at the eUSB2 port 912 as the first bit of SYNC in LS/FS operation.

Figure 10A:
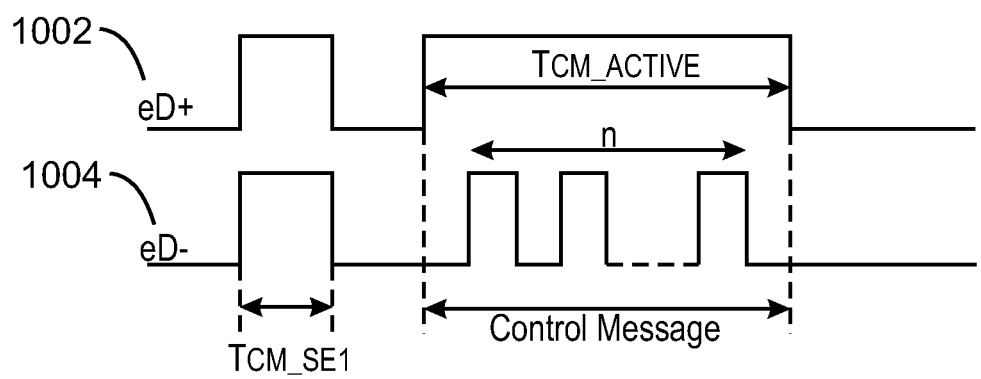
FIG. 10A is a time domain diagram illustrating command messages on the embedded USB positive data line and on the embedded USB negative data line.

FIG. 10A is a time domain diagram illustrating command messages on the embedded USB positive data line and on the embedded USB negative data line. Single ended command messaging may transmit command messages on each of the eD+ data line 1002 and the eD− data line 1004. As illustrated in FIG. 10A, the time domain for a control message in the eD+ data line 1002 may overlap with one or more control messages in the eD− data line 1004.

Figure 10B:
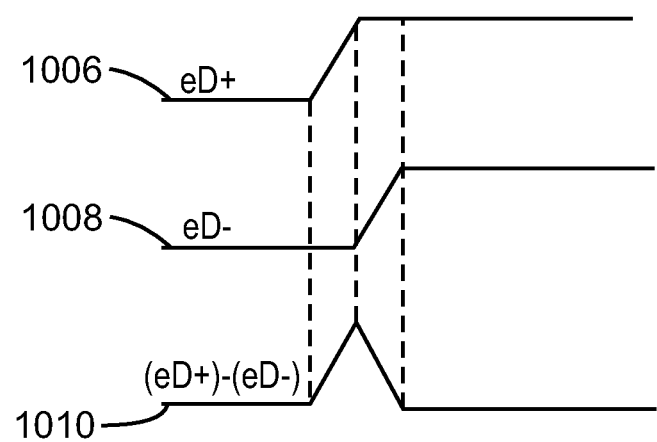
FIG. 10B is a voltage domain diagram illustrating the combination of overlapping control messages under intra-pair skew.

FIG. 10B is a voltage domain diagram illustrating the combination of overlapping control messages under intra-pair skew. The eD+ data line, indicated at 1006, and the eD− data line, indicated at 1008, may combine at 1010. In some scenarios, the voltage of the combined date lines 1010 may be sufficient to meet, or exceed, a threshold voltage indicating a differential signal, rather than a control message.

Figure 11:
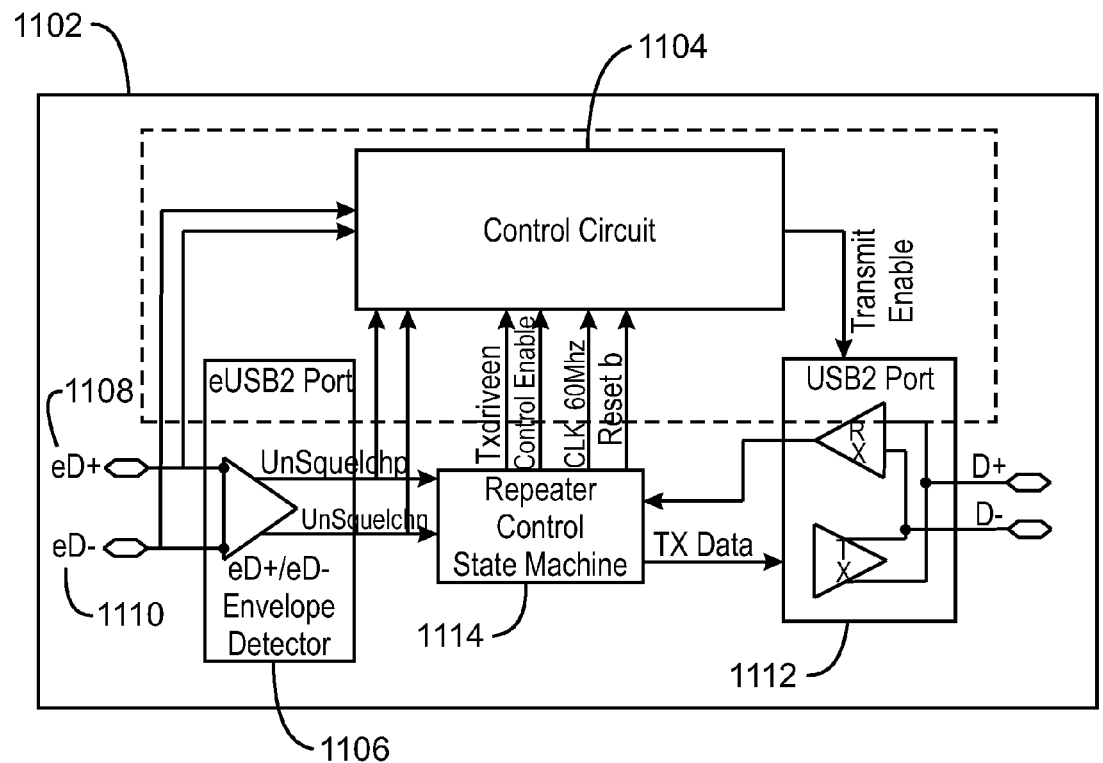
FIG. 11 is a block diagram illustrating a repeater having a squelch detector and a control circuit to filter differential signals generated due to skew between embedded USB2 positive data line and embedded USB2 negative data lines during transmission of a control message.

FIG. 11 is a block diagram illustrating a repeater having a squelch detector and a control circuit to filter differential signals generated due to skew between embedded USB2 positive data line and embedded USB2 negative data lines during transmission of a control message. As discussed above, the control messages are single-ended messages. In some scenarios, a skew associated with the combination of the control messages may be misinterpreted. A control circuit 1104 may be configured to filter out differential spurious noise generated due to skew. The filtering is enabled by using a single ended receiver output and a squelch detector output.

As illustrated in FIG. 11, a repeater 1102 may include the control circuit 1104 communicatively coupled to an envelope detector 1106 and an eD+ data line 1108 as well as an eD− data line 1110. The control circuit 1104 may be configured to determine whether a transition has occurred on both of the eD+ data line 1108 and the eD− data line 1110. Differential signals may be determined at the repeater in a non-return-to-zero (NRZ) condition, such that a binary 1 is indicated by a positive voltage and a binary 0 is indicated by a negative voltage. When a signal is received having only a voltage in one direction (either positive or negative), the control circuit 1104 may determine that the signal is a control message, and may suppress the control message from being communicated on a USB2 port 1112.

In embodiments, an incoming signal may be provided to a repeater control state machine 1114. The repeater control state machine 1114 may receive signals from the envelope detector 1106. Data to be transmitted is provided to the USB2 port 1112 from the repeater control state machine 1114. If the control circuit 1104 has determined that the signals received at the envelope detector 1106 do not have a transition in each of the eD+ data line 1108 and the eD− data line 1110, then the control circuit 1104 determines that the signal was not a differential signal or control message and prevents the USB2 port from transmitting a signal.

Figure 12A:
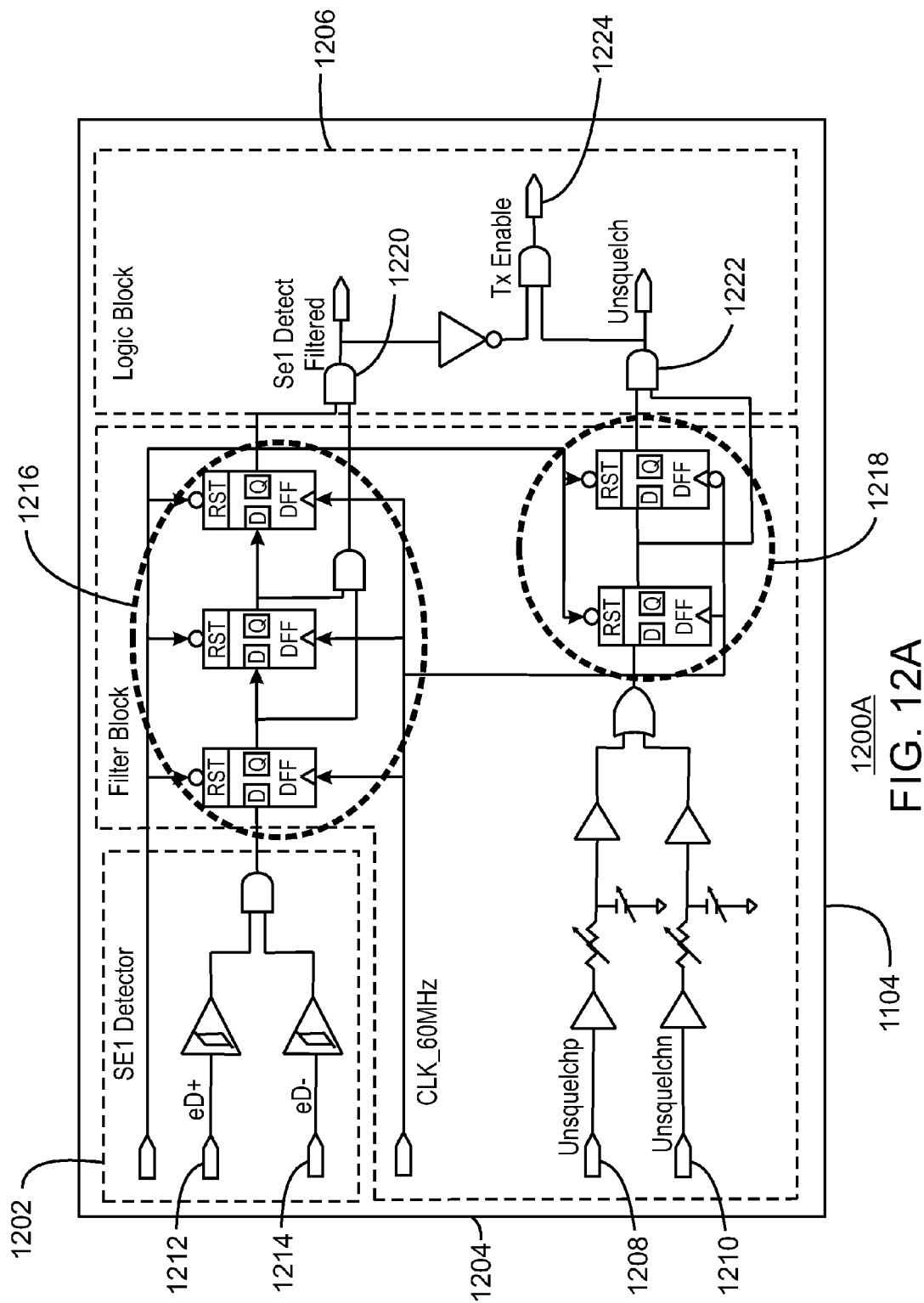
FIG. 12A illustrates a circuit diagram of the control circuit to filter out differential voltage that may cause spurious transaction on USB2 bus under intra-pair skew condition.

FIG. 12A illustrates a circuit diagram of the control circuit to filter out differential voltage that may cause spurious transaction on USB2 bus under intra-pair skew condition. The control circuit 1104 may include an SE1 detector 1202, a filter block 1204, and a logic block 1206. The SE1 detector circuit 1202 detects an SE1 condition. The filter block 1204 filters signals that were not squelched as indicated at 1208 and 1210 by squelch detector 1106, and filter any noise on differential embedded USB2 data line 1212 and 1214 which can be misconceived by SE1 detector since both lines transmit a single ended high signal. The logic block 1206 may gate a HS operation of the repeater 1102 by generating signal 1224.

The SE1 detector circuit 1202 detects when both eD+ data line 1212 and eD− data line 1214 receive a control message. During this condition eD+ and eD− signals are relatively high, or a logic "1," as opposed to relatively low, or a logic "0." SE1 detector circuit 1202 may detects an SE1 condition using single-ended Schmidt trigger buffer on eD+ 1212 and eD− 1214 lines based on a predetermined adjustable threshold. The digital filter circuit 1216 is configured to filter out spurious noise at SE1 detector circuit 1202 output which could be due to a skew between embedded USB2 data lines 1214 and 1216. Non-squelched signals 1208, 1212 are filtered by analog/digital filter, indicated at 1218. The analog/digital filter 1218 is configured to prevent spurious triggering of squelch detector during control message reception. Logic block 1206 uses filtered SE1 detector circuit 1202 output indicated at 1220, and filtered un-squelch output indicated at 1222, and generates control signals, indicated at 1224, that may be used to disable communication at a USB2 bus.

Figure 12B:
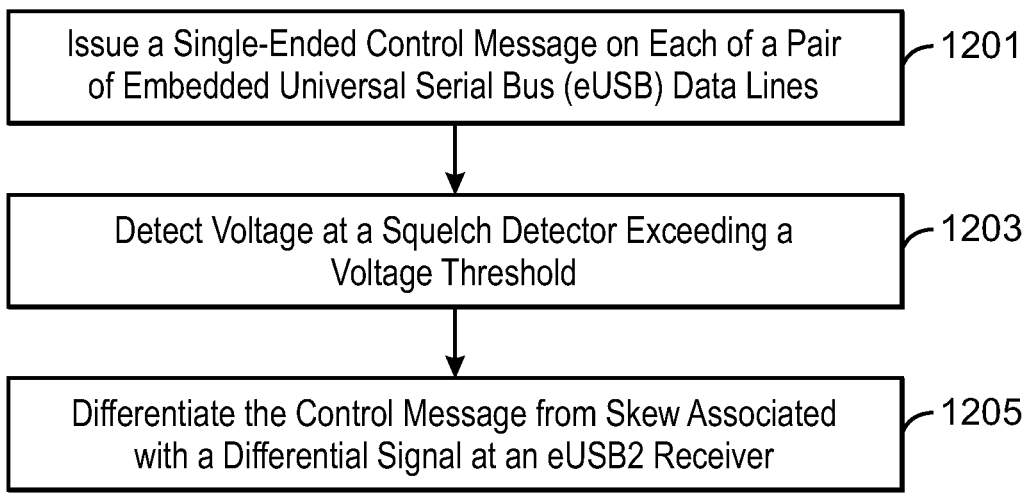
FIG. 12B is a block diagram illustrating a method for explicit control message signaling.

FIG. 12B is a block diagram illustrating a method for explicit control message signaling. As illustrated in FIG. 12B, the method may include issuing a single-ended control message on each of a pair of embedded Universal Serial Bus (eUSB) data lines, as indicated at block 1201. At block 1203, the method may include detecting voltage at a squelch detector exceeding a voltage threshold. At block 1205, the method may include differentiating the control message from skew associated with a differential signal at an eUSB2 receiver.

FIG. 12B is an exemplary illustration of the techniques described herein. However, more or less elements of the method illustrated may be included, or deleted.

Apparatus for USB2 Battery Charging Detection Using Embedded USB2 System.

Energy storage components, such as memory card, a camera, mobile devices, accessory charger adaptor (ACA) docks, and the like, may receive a charge via USB2 coupling. For example, a smartphone may be configured to receive charge from a laptop when coupled to the laptop via a USB2 connection during power on or a dead battery condition to charge a battery of the smartphone. Traditionally, a system on chip (SoC) may communicate with a circuit, such as a power management integrated circuit (PMIC), to control charging functions and total charge needs to transfer.

For example, when a smartphone is coupled to a charging device via USB, a PMIC of the smartphone may determine what type of charging device is presently coupled. A charging device may be defined by USB2 Battery Charging Specification 1.2, Oct. 12, 2011. For example, a charging device type may be a dedicated charging device (DCD), charging downstream port (CDP), standard downstream port (SDP), ACA-docks or other types of devices to be charged as defined by the USB2 battery charging 1.2 (BC 1.2) Compliance Plan, Revision 1.0, Oct. 12, 2011. Traditionally, PMIC may provide information related to battery charging via communications lines, such as Inter-Integrated Circuit ($I^2C$) data lines. The embodiments described herein include an eUSB2 solution to support USB2 battery charging detection and on-the-go (OTG) detection. In the proposed innovation, communication with a eUSB system-on-chip (SoC) regarding charging detection is provided, as well as OTG detection status indication via eUSB2 data lines, thereby reducing a pin count on the eUSB SoC that may otherwise occur if the same information were provided via $I^2C$ data lines. Specifically, by communicating battery charging and OTG detection, as well as status indication register information via eUSB2 data lines, the use of I²C data lines used in some systems to communicate battery charging detection/OTG detection may be eliminated.

Figure 13:
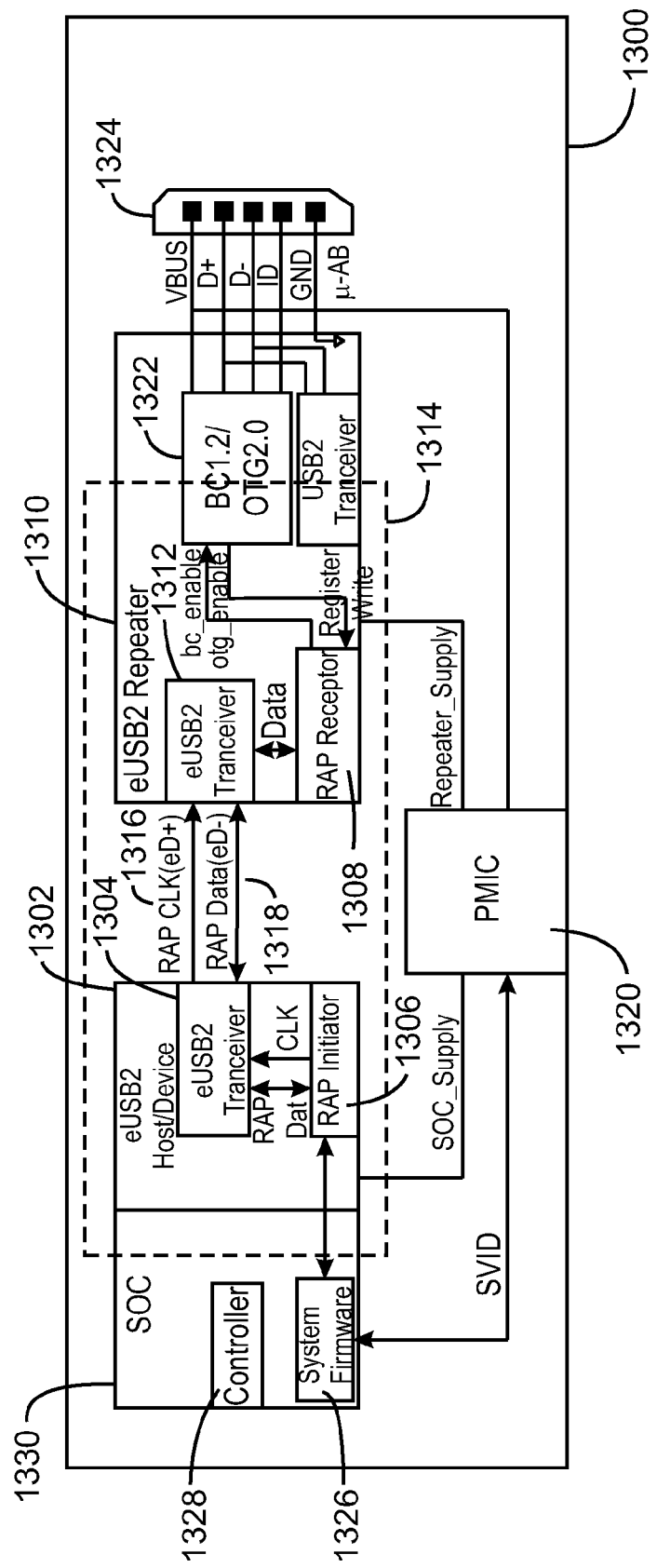
FIG. 13 is a block diagram illustrating a computing device having battery charging detections, OTG 2.0 detections, and status register indication communication through register access protocol over eUSB2 data lines.

FIG. 13 is a block diagram illustrating a computing device having battery charging detections, OTG 2.0 detections, and status register indication communication through register access protocol over eUSB2 data lines. The computing device 1300 may include a SoC 1330. The SoC 1330 includes an eUSB2 port 1302 having an eUSB2 transceiver 1304 and a register access protocol (RAP) initiator 1306. The RAP initiator 1306 may communicate with a RAP receptor 1308 of an eUSB2 repeater 1310, via an eUSB2 transceiver 1312. The dashed box 1314 indicates embodiments of the techniques described herein, wherein battery charging (BC) or On the Go (OTG 2.0) indications may be communicated via embedded data lines eD+ 1316 and eD− 1318 through register access protocol (RAP) which can be controlled by logic, at least partially including hardware logic, such as system firmware 1326.

In embodiments, the RAP initiator 1306 drives a unidirectional clock through the eD+ line 1316, and drives bidirectional data through eD− line 1318. Data coming from a USB transceiver macrocell interface (UTMI) is associated with legacy USB protocol, such as USB2. Data provided from RAP initiator 1306 are multiplexed with UTMI data as part of eUSB2 port 1302. Similarly, data multiplexing at the eUSB2 repeater 1310 selects RAP data and UTMI data. During a cold boot a multiplexer (not shown) selects a RAP data path which is configured by system firmware 1326. The computing device 1300 may include a PMIC 1320 configured to receive an indication of charger type so that PMIC 1320 can configure and provide charging current to device through voltage bus (VBUS) line of a connector 1324. For example, the computing device 1300 may be coupled to a host device, such as a laptop configured to provide charge to the computing device 1300. In other embodiments, the computing device 1300 may be coupled via USB to a printer, wherein the computing device 1300 will detect that the printer is an OTG device, and swap the role of the of the computing device 1300 to enable the computing device 1300 to act as a host having limited host capabilities. The computing device 1300 receives data indicating whether the connected device is a charging device or an OTG device through the battery charging (BC 1.2) and on-the-go (OTG) module 1322. The eUSB2 transceiver 1312 may select RAP data to transmit a status indication to SoC 1302 through eUSB2 data lines 1316, 1318 to the eUSB2 transceiver 1304 by RAP receptor 1308 upon request from RAP initiator 1306.

In embodiments, indication of charger type may be referred to as battery charger (BC) detection as described in the battery charging specification 1.2. An example of BC detection may be found in standards documents, such as the USB Battery Charging 1.2 (BC 1.2) Compliance Plan, Revision 1.0, Oct. 12, 2011. In one embodiment, BC detection is enabled upon power up and before USB2 operation, during a suspend state or L1, during L0 idle, or any combination thereof. After completing BC detection or OTG detection, eUSB2 transceivers 1304, 1312 Multiplexer (not shown in figure) select USB2 data coming from controller 1328 which is translated to eUSB2 bus communication over data lines 1316, 1318.

In embodiments, the PMIC 1320 provides a gated domain and un-gated domain supply to the SoC 1302 and to the eUSB2 repeater 1310. The gated domain and un-gated domains enable power saving as components of each of the SoC 1302 and the eUSB2 repeater 1310 may be powered on incrementally during battery charger detection operation. The eUSB2 repeater 1310 may include a battery charging (BC 1.2) and on-the-go (OTG) module 1322. The RAP receptor 1308 may be communicatively coupled to a register including BC 1.2/OTG related registers. These registers may be written to by the BC 1.2/OTG module 1322, when a kind of battery charger is detected as communicatively coupled to the computing device 1302 via USB pins at the USB2 port 1324. The register values can be read by system firmware 1326 communicatively coupled to a controller 1328 of a computing subsystem 1330 using the RAP initiator 1306. The register values are read by sending a RAP read command to the RAP receptor 1308 via the eD−p/eD− data lines 1316 and 1318.

Figure 14:
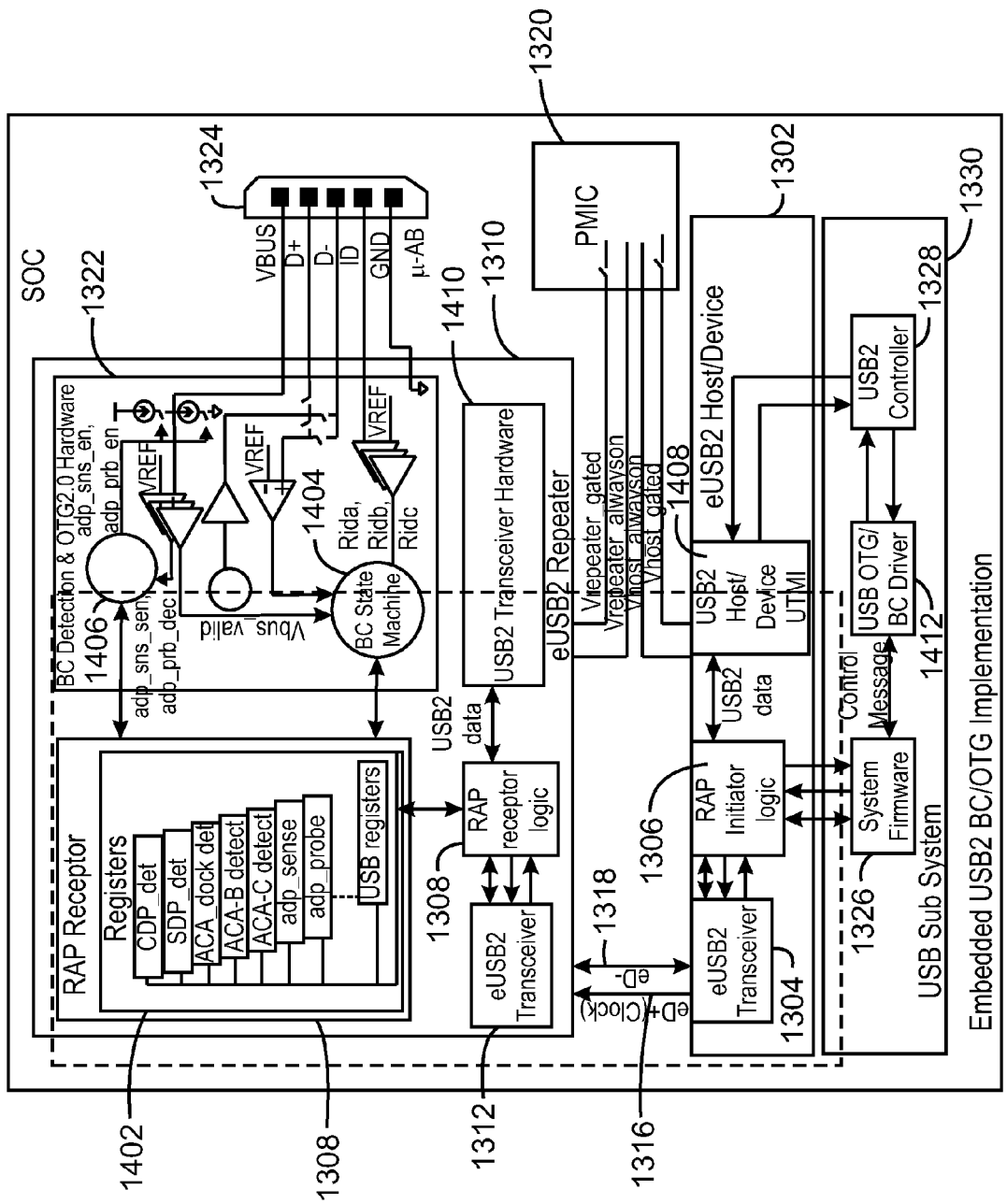
FIG. 14 is a sub-system block diagram illustrating a detailed implementation of computing device having battery charging detection and flow to communicate to a system on chip through eUSB2 data lines.

FIG. 14 is a sub-system block diagram illustrating a detailed implementation of computing device having battery charging detection and flow to communicate to a system on chip through eUSB2 data lines. The computing system 1400 may be similar to the computing system 1300. The embodiment illustrated in FIG. 14 may be one embodiment of a computing device propagating battery charging detection status register information through eUSB2 data lines. As discussed above in reference to FIG. 13, the RAP receptor 1308 may be communicatively coupled to one or more registers 1402 including BC 1.2/OTG related registers. Firmware 1326 can write to the registers 1402 and enable BC 1.2/OTG detection via a BC 1.2/OTG state machine 1404/1406 using RAP write command sent through the RAP initiator 1306. The write command is read by RAP receptor 1308 and enables BC 1.2/OTG detection from the USB2 port 1324. After getting indication from state machines 1404, 1406, a values of a given register 1402 is read by RAP initiator 1308 through polling.

The computing system 1400 includes an USB2 host/device UTMI 1408, USB transceiver 1410 (such as a USB2 port), and an USB BC 1.2/OTG driver 1412. As illustrated in FIG. 14, the BC 1.2/OTG detection block 1322 may include logic associated with the techniques described herein.

In embodiments, data may be written to the registers as described above according to command messages described in table 1 below.

TABLE 1

| CMD (b1~0) | Operation | Description |
| --- | --- | --- |
| 00 | Write | Data is written to the register address |
| 01 | Read | Data is read from the register address |
| 10 | Clear | Active high bit-wise clear with the data on the register address. |
| 11 | Set | Bit-wise OR with the data on the register address |

As illustrated in Table 1, the command messages may read, write, clear, and set addresses of the 1402 using RAP. The operations performed may enable BC 1.2 indications to be received by the PMIC 1320, thereby reducing a pin count of a system package associated with the computing device 1400.

Figure 15:
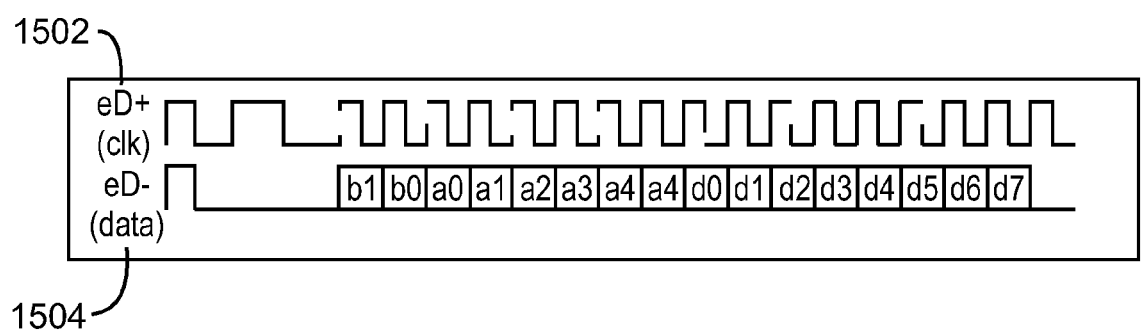
FIG. 15 is a diagram illustrating timing diagram of battery charging detection operations using register access protocol.

FIG. 15 is a diagram illustrating timing diagram of battery charging detection operations using register access protocol. As discussed above, battery charging register operations may include a write operations, a read operations, a clear operations, set operations, and the like. The timing of the waveform 1300 at the eD+ data line is indicated at 1502 while the timing on the eD− data line 1318 is indicated at 1504.

Figure 16A:
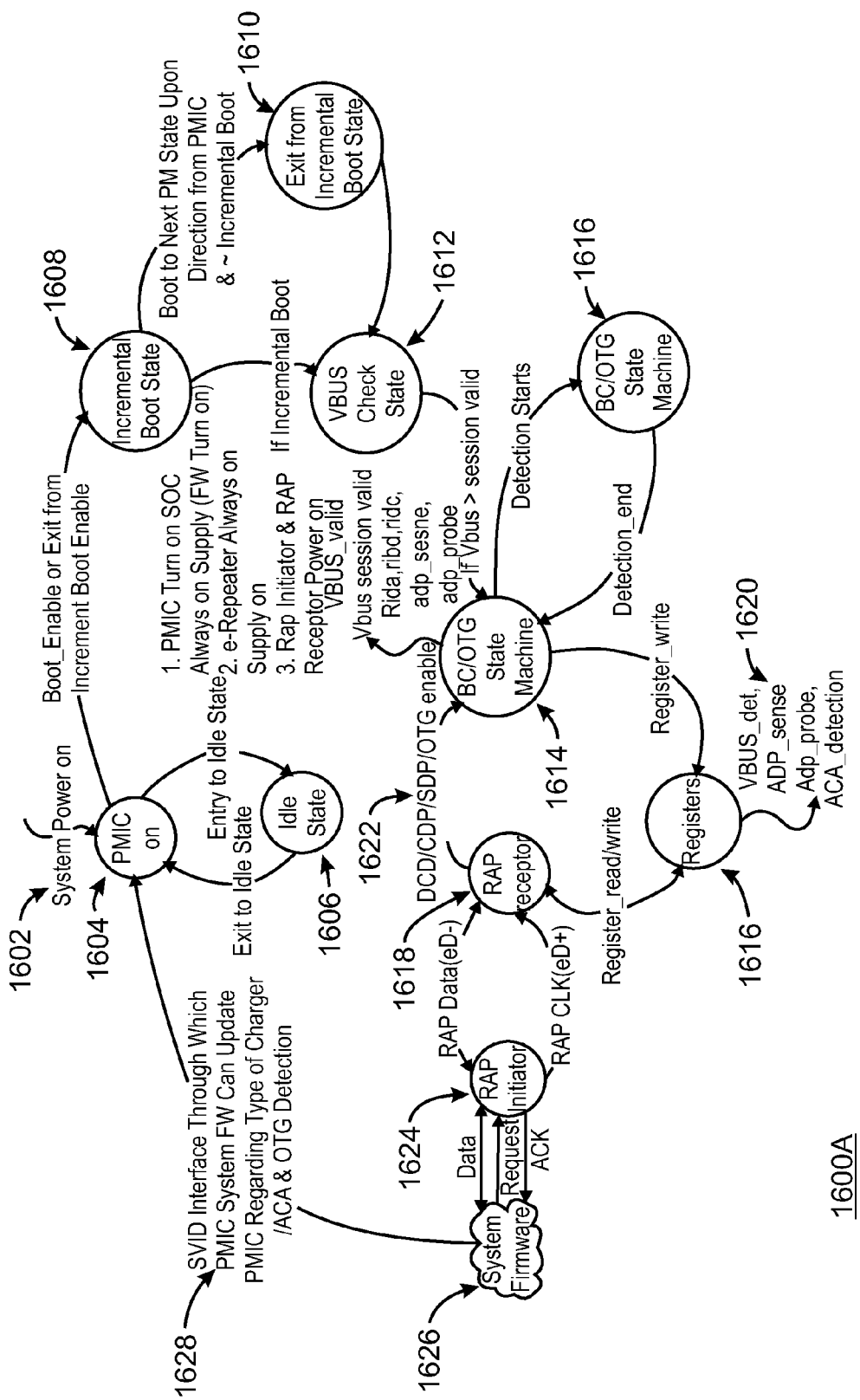
FIG. 16A is a process flow diagram of propagating battery charging indications on eUSB2 data lines.

FIG. 16A is a process flow diagram of propagating battery charging indications on eUSB2 data lines. At 1602, a state where the system is powered on triggering the PMIC to be powered on at 1604. If the PMIC enters into an idle state 1606 if no devices attach, the PMIC will be in active state again after exiting the idle state upon seeing activity on line 1324 in FIG. 14. At 1608, an incremental boot state is initiated. The incremental boot state may incrementally power on components of the eUSB2 repeater 1310 discussed above in reference to FIG. 13. Incremental boot enables significant power saving during boot time by turning on only those components needing detection of battery charging or on-the-go detection. Once components of the eUSB2 repeater 1310 having been booted incrementally, the PMIC exits the incremental boot state at 1610. At 1612, a state of a VBUS voltage is checked to determine whether connection is valid or VBUS presence. If the voltage at the VBUS is greater than the threshold (VBUS valid) then a state machine is booted at state 1614. Either the BC state machine, the OTG state machine, or a combination of the BC state machine and the OTG state machine begin to detect the BC and/or OTG states. At state 1614, Battery charging or OTG detection is enabled. After completing detections, OTG/Battery charging state machine updates status indication at registers 1616. Upon getting an indication of register read/write by RAP initiator, RAP receptor reads a status register at 1618. Registers are accessed by the RAP receptor 1618 for reads, writes, or any combination of reads and writes.

At 1620, VBUS detection, ADP sensing, ADP probing, accessory charger adaptor (ACA) detection, and battery charging detection may be performed. VBUS detection includes determining whether voltage on a bus is high, such as greater than 4.2 volts (V), or low, such as less than 4.2 V. ADP sensing includes a determination of whether voltage on the bus is less than 325 mV during device de-attach detection. ADP probing includes a determination of whether voltage on the bus is greater than 625 mV during device attach detection. ACA detection includes determining whether voltage on the bus indicates an accessory charger adaptor. ACA detection, dedicated charging detection (DCD), charging downstream detection (CDP) and standard downstream port (SDP) detection may occur as per BC 1.2 specification in view of the proposed innovation discussed herein.

At 1622, DCD/CDP/SDP/OTG is enabled. At 1624, data indicating battery charging detection status register information is provided to the RAP initiator. At 1626, data is provided to the system firmware, and at 1628, the data is provided back to the PMIC to control charger to increase charging current to connected devices. As indicated in FIG. 16, an interface may enable the system firmware to update the PMIC regarding the type of charger connected to the computing device as well as ACA and OTG detection.

Figure 16B:
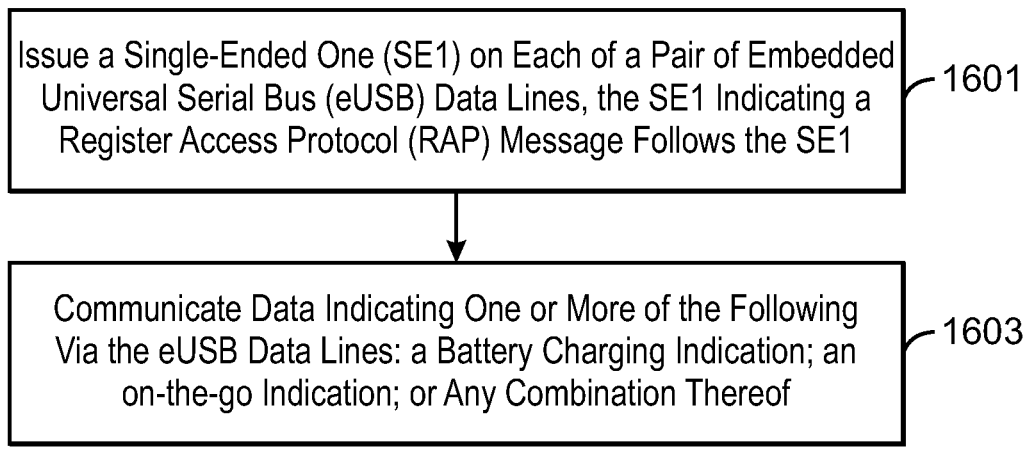
FIG. 16B is a block diagram illustrating a method for explicit control message signaling.

FIG. 16B is a block diagram illustrating a method for explicit control message signaling. As illustrated in FIG. 16B, the method may include issuing a single-ended one (SE1) on each of a pair of embedded Universal Serial Bus (eUSB) data lines, the SE1 indicating a register access protocol (RAP) message follows the SE1, as indicated at block 1601. At block 1603, the method may include communicating data indicating one or more of the following via the eUSB data lines: a battery charging indication; an on-the-go indication; or any combination thereof.

FIG. 16B is an exemplary illustration of the techniques described herein. However, more or less elements of the method illustrated may be included, or deleted.

Method and Apparatus of Line Polarity Detection and Correction for eUSB2.

An eD+ data line may be configured to communicate positive signals between eUSB2 components, while an eD− data lines may be configured to communicate negative signals between eUSB2 components. In some scenarios, polarity of data lines of an eUSB2 bus may be inverted. For example, in future implementations of USB as an external device connection interface, reversible plugs may be used enabling a user to flip orientation of a USB connector, and resulting in a polarity inversion at an eUSB2 repeater communicatively coupled to the USB connector. As another example, density of internal device interconnect may require polarity inversion within routing layers of an interconnect structure. In embodiments described herein, inverse polarity is detected at an eUSB2 component via control message signaling.

Figure 17:
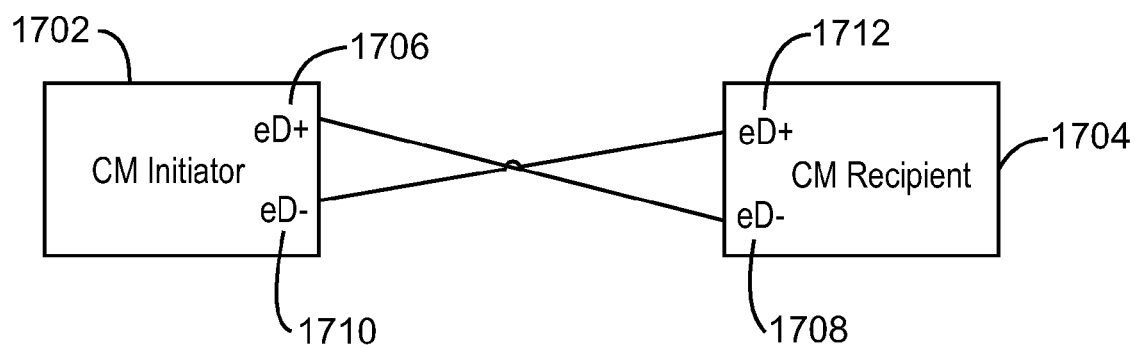
FIG. 17 illustrates a block diagram illustrating eUSB2 components having communicative coupling of inverse polarity.

FIG. 17 illustrates a block diagram illustrating eUSB2 components having communicative coupling of inverse polarity. The eUSB2 components 1702 and 1704 may be any eUSB2 components such as an eUSB2 repeater, an eUSB2 upstream port, an eUSB2 downstream port, and the like. For purposes of discussion, the eUSB2 component 1702 may be referred to herein as a control message initiator, and the eUSB2 component 1704 may be referred to herein as a control message recipient. As illustrated in FIG. 17, the eD+ data line port, indicated at 1706, of the command message initiator 1702 may be communicatively coupled to an eD− data line port, indicated at 1708, of the command message recipient 1704. Similarly, the eD− data line port, indicated at 1710, of the command message initiator 1702 may be communicatively coupled to an eD− data line port, indicated at 1712, of the command message recipient 1704. The coupling of positive ports to ports configured to receive negative polarity signals, as well as the coupling of negative ports to ports configured to receive positive polarity signals, is one example of polarity inversion in the eUSB2 data lines. To detect inversion, eUSB2 components, such as the control message initiator 1702 and the control message recipient 1704 may implement control messages.

Specifically, the control message initiator 1702 may direct a control message during device states, such as during initialization, power up, and subsequent line polarity correction. The control message recipient 1704 may receive control messages and may detect line polarity inversion, as described in more detail below.

Figure 18A:
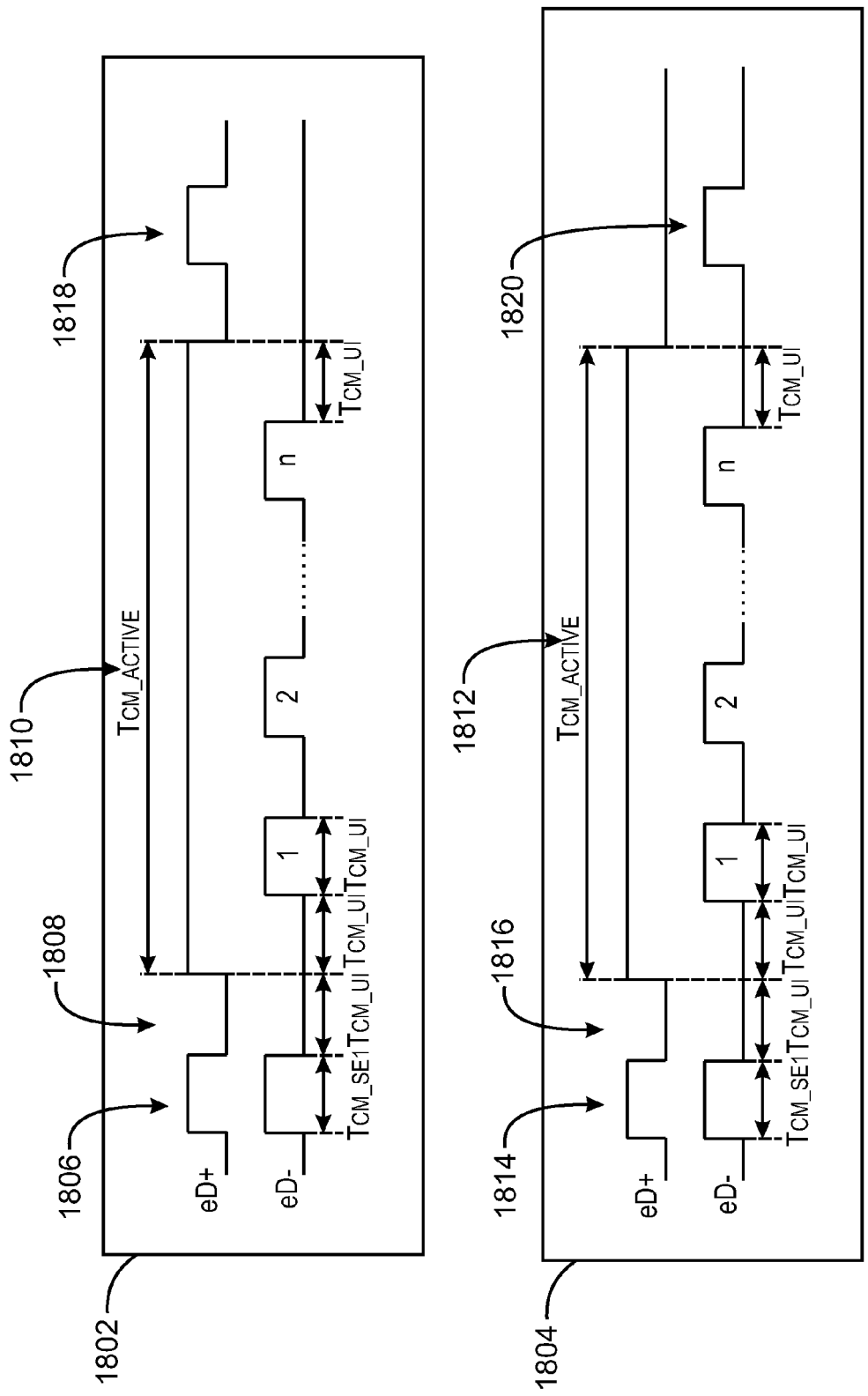
FIG. 18A is a diagram illustrating signaling on eUSB2 data lines.

FIG. 18A is a diagram illustrating signaling on eUSB2 data lines. Block 1802 illustrates control signaling when data line polarity is not inverted, and block 1804 illustrates control signaling when polarity of data lines is inverted. A control message may consist of four parts. A first part is single-ended logic "1" (SE1), indicated at 1806, intended to initiate the control message. A second part is single-ended logic "0" (SE0) indicated at 1808, intended to allow a CM recipient, such as the CM recipient 1704, to prepare for a subsequent operation. A third part is content of the control message represented by a number of pulses at eD− within the active window $T_{cm\_Active}$ set by eD+, as indicated at 1810. According to embodiments, a control message may include a fourth part wherein a digital ping is transmitted on eD+ line if no line polarity exists as an acknowledgement, or a ping transmitted over eD− if lines are inverted as an acknowledgement, as discussed in more detail below.

In the inverted case 1804, the data lines eD+ and eD− are inverted such that the active window is propagated on the eD− data line and the control message pulses are propagated on the eD+ data line as indicated at 1812. However, SE1, indicated at 1814, is unchanged when compared to the SE1 1806 in the non-inverted case 1802. Further, SE0, indicated at 1816, is unchanged when compared to the SE0 1808 in the non-inverted case 1802. In other words, because the command message portions SE0 and SE1 are the same on eUSB2 data lines in either the inverted or non-inverted case, the CM recipient 1704 may accurately detect the SE0 and SE1 signals in either an inverted or non-inverted scenario. Once the SE1 signal, followed by the SE0 signal, are received by the CM recipient 1704, the CM recipient 1704 determines whether the active window exists on the eD− data line (indicating an inverted case 1804) and transmit a digital ping 1820 after the active window on eD− line as an acknowledgement so that a CM initiator can read this digital ping and understand line polarity is inverted. In contrast, if the active window exists on the eD+ data line (indicating a non-inverted case 1802), a digital ping 1818 is transmitted over eD+ as an acknowledgement so that the CM initiator 1702 can read digital ping 1818 over eD+ and determine that the line polarity is unchanged.

Figure 18B:
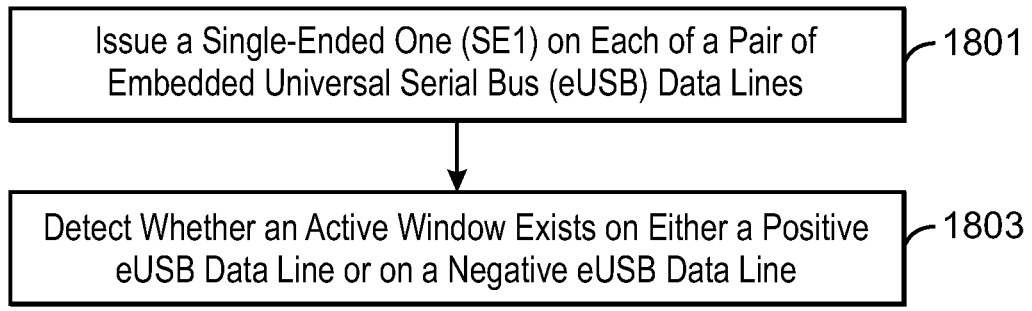
FIG. 18B is a block diagram illustrating a method for explicit control message signaling.

FIG. 18B is a block diagram illustrating a method for explicit control message signaling. As illustrated in FIG. 18B, the method may include issuing a single-ended one (SE1) on each of a pair of embedded Universal Serial Bus (eUSB) data lines, as indicated at block 1801. At block 1803, the method may include detecting whether an active window exists on either a positive eUSB data line or on a negative eUSB data line.

FIG. 18B is an exemplary illustration of the techniques described herein. However, more or less elements of the method illustrated may be included, or deleted.

Figure 19:
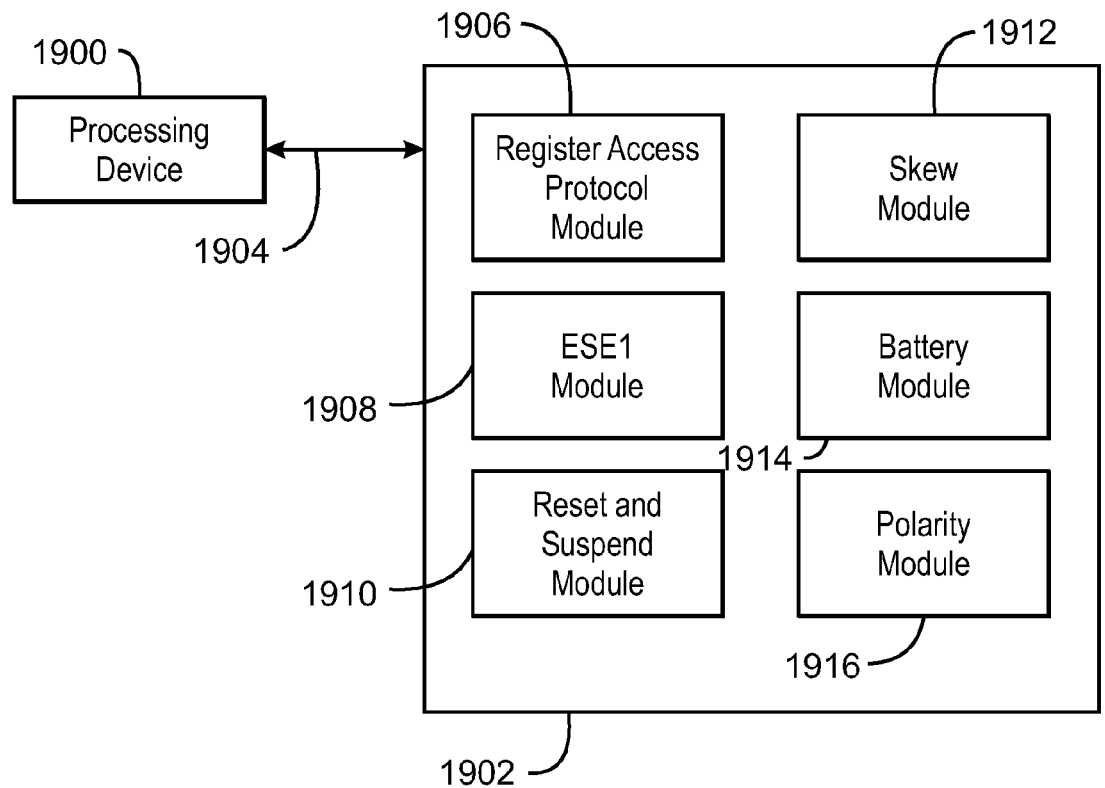
FIG. 19 is a block diagram of a computer readable medium 1900 that includes modules for eUSB2 operations.

FIG. 19 is a block diagram of a non-transitory computer readable medium that includes modules for eUSB2 operations. A processor 1900 accesses modules of the computer readable medium 1902 over a system bus 1904.

The modules can include a register access protocol module 1906, an ESE1 module 1908, a reset and suspend module 1910, a skew module 1912, a battery module 1914, a polarity module 1916, and the like. The modules of the computer readable medium 1902 may be configured to carry out the operations discussed herein.

In the description contained herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

In the Examples discussed below, an embedded high speed serial interface is described. A serial high speed interface may include an embedded Universal Serial Bus (eUSB) as one example. However, other embedded high speed serial interfaces may be used.

In Example 1, a method for explicit message signaling is described herein. An SE1 may be issued on each of a pair of embedded high speed serial interface lines. The SE1 indicates a RAP message follows the SE1 signal. The method includes accessing a register of an embedded high speed serial interface component based on the RAP message.

Example 2 incorporates subject matter of Example 1. In this example, the embedded high speed serial interface data lines include a positive embedded high speed serial interface data line and a negative embedded high speed serial interface data line.

Example 3 incorporates the subject matter of Example 2. In this example, the positive embedded high speed serial interface data line carries a clock signal for the RAP message, and the negative embedded high speed serial interface data line carries instructions of the RAP message. The instructions may include a read operation, a write operation, a clear operation, or any combination thereof.

Example 4 incorporates the subject matter of any combination of Examples 1-3. In this example, the SE1 signal is issued by a RAP initiator to a RAP receptor of the embedded high speed serial interface component. The RAP initiator is communicatively coupled via embedded high speed serial interface data lines to the embedded high speed serial interface component.

Example 5 incorporates the subject matter of any combination of Examples 1-4. In this example, the SE1 signal is issued by a RAP initiator of an embedded high speed serial interface port to a RAP receptor of the embedded high speed serial interface component having an embedded high speed serial interface repeater.

Example 6 incorporates the subject matter of any combination of Examples 1-5. In this example, the SE1 signal is issued by a RAP initiator of an downstream embedded high speed serial interface port to a RAP receptor of the embedded high speed serial interface component including an upstream embedded high speed serial interface port.

Example 7 incorporates the subject matter of any combination of Examples 1-6. In this example, following the SE1 signal, a clock signal is forwarded on a positive embedded high speed serial interface data line and a two-bit command message is forwarded on a negative embedded high speed serial interface data line.

Example 8 incorporates the subject matter of any combination of Examples 1-7. In this example, the RAP information is related to power on, idle, suspend state, connect, disconnect, reset, or any combination thereof.

Example 9 incorporates the subject matter of any combination of Examples 1-8. In this example, the SE1 signal is issued in-band to the embedded high speed serial interface protocol over differential embedded high speed serial interface data lines.

Example 10 incorporates the subject matter of any combination of Examples 1-9. In this example, the RAP message includes a command message containing a clock and an indication of a type of operation to be performed at the register.

Example 11 is a system for explicit control message signaling. The system includes a pair of embedded high speed serial interface data lines. The system also includes a register of an embedded high speed serial interface component. The system further includes an embedded high speed serial interface port. In some scenarios, the embedded high speed serial interface port includes logic to issue a single-ended one (SE1) signal on each of the pair of embedded high speed serial interface data lines, the SE1 indicating a register access protocol (RAP) message follows the SE1 signal. The logic may be configured to access the register of the embedded high speed serial interface component based on the RAP message.

Example 12 incorporates the subject matter of Example 11. In this example, the embedded high speed serial interface data lines include a positive embedded high speed serial interface data line (eD+) and a negative embedded high speed serial interface data line (−eD).

Example 13 incorporates the subject matter of any combination of Examples 11-12. In this example, the eD+ data line is to carry a clock signal for the RAP message. The eD− data line is to carry instructions of the RAP message. The instructions of the RAP message may include a read operation, a write operation, a clear operation, or any combination thereof.

Example 14 incorporates the subject matter of any combination of Examples 11-13. In this example, the embedded high speed serial interface port includes a RAP initiator. The SE1 signal is to be issued by the RAP initiator to a RAP receptor of the embedded high speed serial interface component. The RAP initiator is communicatively coupled via the embedded high speed serial interface data lines to the embedded high speed serial interface component.

Example 15 incorporates the subject matter of any combination of Examples 11-14. In this example, the embedded high speed serial interface component includes an embedded high speed serial interface repeater. The SE1 signal is issued by a RAP initiator of an embedded high speed serial interface port to a RAP receptor of the embedded high speed serial interface repeater.

Example 16 incorporates the subject matter of any combination of Examples 11-15. In this example, the embedded high speed serial interface port is a downstream port including a RAP initiator. The RAP initiator is to issue the SER1 to a RAP receptor of the embedded high speed serial interface component including an upstream embedded high speed serial interface port.

Example 17 incorporates the subject matter of any combination of Examples 11-16. In this example, following the SE1 signal, the embedded high speed serial interface port is to forward a clock signal on a positive embedded high speed serial interface data line and forward a two-bit command message on a negative embedded high speed serial interface data line.

Example 18 incorporates the subject matter of any combination of Examples 11-17. In this example, the RAP information is related to a power on instruction, a set to idle instruction, a set to suspend state instruction, a connect instruction, a disconnect instruction, a reset instruction, or any combination thereof.

Example 19 incorporates the subject matter of any combination of Examples 11-18. In this example, the SE1 signal is to be issued in-band to the embedded high speed serial interface protocol over differential embedded high speed serial interface data lines.

Example 20 incorporates the subject matter of any combination of Examples 11-19. In this example, the RAP message includes a command message containing a clock and an indication of a type of operation to be performed at the register.

Example 21 provides a computer readable medium including code. The computer readable medium may be a non-transitory computer readable medium. The code, when executed cause a processing device to issue a single-ended one (SE1) signal on each of a pair of embedded high speed serial interface data lines, the SE1 indicating a register access protocol (RAP) message follows the SE1 signal. The code is also configured to cause the processor to access a register of an embedded high speed serial interface component based on the RAP message.

Example 20 incorporates the subject matter of any combination of Examples 11-19. In this example, the RAP message is a command message containing a clock and an indication of a type of operation to be performed at the register.

Example 21 describes a computer readable medium. In some scenarios, the computer readable medium is not transitory. The computer readable medium includes code to direct the processor to issue a single-ended one (SE1) signal on each of a pair of embedded high speed serial interface data lines, the SE1 indicating a register access protocol (RAP) message follows the SE1 signal. The code, when executed by the processor, may direct the processor to access a register of an embedded high speed serial interface component based on the RAP message.

Example 22 incorporates the subject matter of any combination of Examples 21-22. In this example, the embedded high speed serial interface data lines include a positive embedded high speed serial interface data line (eD+) and a negative embedded high speed serial interface data line (eD−).

Example 23 incorporates the subject matter of any combination of Examples 21-22. In this example, the eD+ data line is to carry a clock signal for the RAP message and the eD− data line is to carry instructions of the RAP message. The RAP message includes a read operation, a write operation, a clear operation, or any combination of these operations.

Example 24 incorporates the subject matter of any combination of Examples 21-23. In this example, the SE1 signal is to be issued by a RAP initiator to a RAP receptor of the embedded high speed serial interface component. The RAP initiator is communicatively coupled via embedded high speed serial interface data lines to the embedded high speed serial interface component.

Example 25 incorporates the subject matter of any combination of Examples 21-24. In this example, wherein the SE1 signal is to be issued by a RAP initiator of an embedded high speed serial interface port to a RAP receptor of the embedded high speed serial interface component including an embedded high speed serial interface repeater.

Example 26 incorporates the subject matter of any combination of Examples 21-25. In this example, the SE1 is to be issued by a RAP initiator of a downstream embedded high speed serial interface port to a RAP receptor of the embedded high speed serial interface component including an upstream embedded high speed serial interface port.

Example 27 incorporates the subject matter of any combination of Examples 21-26. In this example, following the SE1 signal, the code is to cause the processor to forward a clock signal is on a positive embedded high speed serial interface data line and a forward a two-bit command message is on a negative embedded high speed serial interface data line.

Example 28 incorporates the subject matter of any combination of Examples 21-27. In this example, the RAP information is related to a power on instruction, a set to idle instruction, a set to suspend state instruction, a connect instruction, a disconnect instruction, a reset instruction, or any combination thereof.

Example 29 incorporates the subject matter of any combination of Examples 21-28. In this example, the SE1 signal is to be issued in-band to the embedded high speed serial interface protocol over differential embedded high speed serial interface data lines.

Example 30 incorporates the subject matter of any combination of Examples 21-29. In this example, the RAP message includes a command message containing a clock and an indication of a type of operation to be performed at the register.

In Example 31, a computer readable medium is described. The computer readable medium may be non-transitory in some cases. The computer readable medium may include code that, when executed by a processing device, cause the processing device to execute the method of any combination of Examples 1-10.

In Example 32, an apparatus for explicit control message signaling is described. In this example, the apparatus includes a means for issuing a single-ended one (SE1) signal on each of a pair of embedded high speed serial interface data lines, the SE1 indicating a register access protocol (RAP) message follows the SE1 signal. The apparatus also includes a means for accessing a register of an embedded high speed serial interface component based on the RAP message.

Example 33 incorporates the subject matter of Example 32. In this example, the SE1 is issued by a RAP initiator of a downstream embedded high speed serial interface port to a RAP receptor of the embedded high speed serial interface component including an upstream embedded high speed serial interface port.

Example 34 incorporates the subject matter of any combination of Examples 32-33. In this example, the apparatus includes a means for forwarding a clock signal on a positive embedded high speed serial interface data line following the SE1 transmission. Further, the apparatus includes a means for forwarding a two-bit command message is on a negative embedded high speed serial interface data line following the SE1 transmission.

In Example 35, an apparatus for explicit control message signaling is described. In this example, the apparatus includes a means for performing the method of any combination of Examples 1-10.

In Example 36, a method for explicit control message signaling is described. In this example, the method includes detecting an idle state on a pair of data lines for a first predetermined period of time. The method includes transmitting a control message to an embedded high speed serial interface repeater within a second predetermined period of time subsequent to the first predetermined period of time. Further, the method includes determining entry into either an idle state or a reset state.

Example 37 incorporates the subject matter of example 36. In this example, determining entry into either an idle state or a reset state includes removing voltage pull-downs at the embedded high speed serial interface repeater, and sampling data transfer rate at the pair of data lines after the voltage pull-downs are removed. Further, determining entry into either an idle state or a reset state includes issuing a digital ping if a state of the data lines has changed after removing the voltage pull-downs, and determining entry into either an idle state or a reset state based on whether a digital ping has been issued.

Example 38 incorporates the subject matter of any combination of Examples 36-37. In this example, wherein the first predetermined period of time is between about 0 milliseconds and about 3 milliseconds.

Example 39 incorporates the subject matter of any combination of Examples 36-38. In this example, the second predetermined period of time between about 3 milliseconds and about 3.125 microseconds after initially detecting the idle state.

Example 40 incorporates the subject matter of any combination of Examples 36-39. In this example, the method further includes identifying the data line state to be an idle state if the line data line state remains unchanged after removing the voltage pull-downs.

Example 41 incorporates the subject matter of any combination of Examples 36-40. In this example, the method further includes transmitting a control message from an embedded high speed serial interface host device to the embedded high speed serial interface repeater to initialize the method signaling entry into either the reset state or the idle state.

Example 42 incorporates the subject matter of any combination of Examples 36-41. In this example, the method further includes declaring entry into the reset state if no digital ping is detected.

Example 43 incorporates the subject matter of any combination of Examples 36-42. In this example, the method further includes declaring entry into the idle state if a digital ping is detected.

Example 44 incorporates the subject matter of any combination of Examples 36-43. In this example, the data lines are legacy USB data lines. The control message is provided in band via the legacy USB data lines as opposed to via out-of-band signal lines.

Example 45 incorporates the subject matter of any combination of Examples 36-44. In this example, the embedded high speed serial interface repeater is a peripheral repeater of a peripheral device including a downstream embedded high speed serial interface port.

In Example 46, an system for explicit control message signaling is described. In this example, the system includes an embedded high speed serial interface repeater and an embedded high speed serial interface port communicatively coupled to the embedded high speed serial interface repeater. The embedded high speed serial interface port may include logic, at least partially including hardware logic, to detect an idle state on a pair of legacy Universal Serial Bus (USB) data lines communicatively coupled to the embedded high speed serial interface repeater for a first predetermined period of time. The logic may be configured to transmit a control message to the embedded high speed serial interface repeater within a second predetermined period of time subsequent to the first predetermined period of time. Further, the logic may be configured to determine entry into either an idle state or a reset state.

Example 47 incorporates the subject matter of claim 46. In this example, to determine entry into either an idle state or a reset state, the embedded high speed serial interface port is to remove voltage pull-downs at the embedded high speed serial interface repeater, and sample data transfer rate at the pair of legacy Universal Serial Bus (USB) data lines after the voltage pull-downs are removed. Further, the embedded high speed serial interface port is to issue a digital ping if a state of the data lines has changed after removing the voltage pull-downs, and determine entry into either an idle state or a reset state based on whether a digital ping has been issued.

Example 48 incorporates the subject matter of any combination of Examples 46-47. In this example, the first predetermined period of time is between about 0 milliseconds and about 3 milliseconds.

Example 49 incorporates the subject matter of any combination of Examples 46-48. In this example, the second predetermined period of time between about 3 milliseconds and about 3.125 microseconds after initially detection of the idle state.

Example 50 incorporates the subject matter of any combination of Examples 46-49. In this example, the embedded high speed serial interface port is to identify the data line state to be an idle state if the line data line state remains unchanged after removing the voltage pull-downs.

Example 51 incorporates the subject matter of any combination of Examples 46-50. In this example, the embedded high speed serial interface port is a port of an embedded high speed serial interface host device to transmit a control message to the embedded high speed serial interface repeater to initialize the signaling for entry into either the reset state or the idle state.

Example 52 incorporates the subject matter of any combination of Examples 46-51. In this example, the embedded high speed serial interface port is to declare entry into the reset state if no digital ping is detected.

Example 53 incorporates the subject matter of any combination of Examples 46-52. In this example, the embedded high speed serial interface port is to declare entry into the idle state if a digital ping is detected.

Example 54 incorporates the subject matter of any combination of Examples 46-53. In this example, the data lines are legacy USB data lines, and the control message is provided in band via the legacy USB data lines as opposed to via out-of-band signal lines.

Example 55 incorporates the subject matter of any combination of Examples 46-54. In this example, the embedded high speed serial interface repeater is a peripheral embedded high speed serial interface repeater of a peripheral device.

Example 56 describes a computer readable medium. In some scenarios, the computer readable medium is non-transitory. The computer readable medium includes code to direct the processor to detect an idle state on a pair of legacy Universal Serial Bus (USB) data lines communicatively coupled to an embedded high speed serial interface repeater for a first predetermined period of time. The computer readable medium includes code to direct the processor to transmit a control message to the embedded high speed serial interface repeater within a second predetermined period of time subsequent to the first predetermined period of time and determine entry into either an idle state or a reset state.

Example 57 incorporates the subject matter of Example 56. In this example, to determine entry into either an idle state or a reset state, executable code is to cause the processor to remove voltage pull-downs at the embedded high speed serial interface repeater, and sample data transfer rate at the pair of legacy Universal Serial Bus (USB) data lines after the voltage pull-downs are removed. To determine entry into either an idle state or a reset state, executable code is to cause the processor to issue a digital ping if a state of the data lines has changed after removing the voltage pull-downs, and determine entry into either an idle state or a reset state based on whether a digital ping has been issued.

Example 58 incorporates the subject matter of any combination of Examples 56-57. In this example, the first predetermined period of time is between about 0 milliseconds and about 3 milliseconds.

Example 59 incorporates the subject matter of any combination of Examples 56-58. In this example, the second predetermined period of time between about 3 milliseconds and about 3.125 microseconds after initially detection of the idle state.

Example 60 incorporates the subject matter of any combination of Examples 56-59. In this example, the executable code is to cause the processor to identify the data line state to be an idle state if the line data line state remains unchanged after removing the voltage pull-downs.

Example 61 incorporates the subject matter of any combination of Examples 56-60. In this example, the processing device is a port of an embedded high speed serial interface host device to transmit a control message to the embedded high speed serial interface repeater to initialize the signaling for entry into either the reset state or the idle state.

Example 62 incorporates the subject matter of any combination of Examples 56-61. In this example, the executable code is to cause the processor to declare entry into the reset state if no digital ping is detected.

Example 63 incorporates the subject matter of any combination of Examples 56-62. In this example, the executable code is to cause the processor to declare entry into the idle state if a digital ping is detected.

Example 64 incorporates the subject matter of any combination of Examples 56-63. In this example, the data lines are legacy USB data lines, and the control message is provided in band via the legacy USB data lines as opposed to via out-of-band signal lines.

Example 65 incorporates the subject matter of any combination of Examples 56-64. In this example, the embedded high speed serial interface repeater is a peripheral embedded high speed serial interface repeater of a peripheral device.

Example 66 describes a computer readable medium. In some scenarios, the computer readable medium is non-transitory. The computer readable medium includes code to direct the processor to execute the method of any combination of Examples 36-45.

Example 67 describes an apparatus for explicit control message signaling. The apparatus includes a means for detecting an idle state on a pair of data lines during a first predetermined period. The apparatus includes a means for transmitting a control message to an embedded high speed serial interface repeater within a second predetermined period of time. The second predetermined period is temporally subsequent to the first predetermined period of time. The apparatus also includes a means for determining entry into either an idle state or a reset state.

Example 68 includes in the subject matter of Example 67. In this example, the means for determining entry into either an idle state or a reset state includes a means for removing voltage pull-downs at the embedded high speed serial interface repeater, and a means for sampling data transfer rate at the pair of data lines after the voltage pull-downs are removed. The means for determining entry into either an idle state or a reset state further includes a means for issuing a digital ping if a state of the data lines has changed after removing the voltage pull-downs, and a means for determining entry into either an idle state or a reset state based on whether a digital ping has been issued.

Example 69 includes the subject matter of any combination of Examples 67-68. In this example, the apparatus further includes a means for transmitting a control message from an embedded high speed serial interface host device to the embedded high speed serial interface repeater to initialize the method signaling entry into either the reset state or the idle state.

Example 70 describes an apparatus for control message signaling. In this example, a means for performing the method of any combination of Examples 36-45 is included in the apparatus.

Example 71 includes a method for explicit control message signaling is described. The method includes monitoring line states of a pair of embedded high speed serial interface data lines. The method includes issuing an extended single-ended one (ESE1), wherein the ESE1 is issued for a duration to override contending signals on the embedded high speed serial interface data lines.

Example 72 includes the subject matter of Example 71. In this example, the ESE1 is issued to terminate a Universal Serial Bus session.

Example 73 includes the subject matter of any combination of Examples 71-72. In this example, the ESE1 is issued to terminate a Universal Serial Bus (USB) session and resolve an unrecognizable embedded high speed serial interface event.

Example 74 includes the subject matter of any combination of Examples 71-73. In this example, a number of ESE1 issuing attempts are limited to a predetermined number of times.

Example 75 includes the subject matter of any combination of Examples 71-74. In this example, the ESE1 signaling is issued from an embedded high speed serial interface upstream port. The method may further include entering a suspend state at an embedded high speed serial interface downstream port upon issuing an ESE1 attempt the predetermined number of times.

Example 76 includes the subject matter of any combination of Examples 71-75. In this example, the ESE1 signaling is issued from an embedded high speed serial interface downstream port communicatively coupled to an upstream embedded high speed serial interface port. Transmitting the ESE1 by the embedded high speed serial interface downstream port is performed upon power on, when directed to perform a soft connect by the upstream port, or any combination of the thereof.

Example 77 includes the subject matter of any combination of Examples 71-76. In this example, the ESE1 signaling is issued from an embedded high speed serial interface upstream port to perform a soft connect.

Example 78 includes the subject matter of any combination of Examples 71-77. In this example, the ESE1 signaling is issued from an embedded high speed serial interface repeater if directed to perform a device disconnect.

Example 79 includes the subject matter of any combination of Examples 71-78. In this example, the ESE1 signaling is issued from a downstream embedded high speed serial interface repeater to a downstream embedded high speed serial interface port upon detection of a host disconnect.

Example 80 includes the subject matter of any combination of Examples 71-79. In this example, the method further includes declaring ESE1 reception at an embedded high speed serial interface port, and remaining in or transitioning to a power-on state occurring before the reception of the ESE1.

Example 81 includes a system for explicit control message signaling is described. The system includes an embedded high speed serial interface device including logic, at least partially including hardware logic, to monitor line states of a pair of embedded high speed serial interface data lines, and issue an extended single-ended one (ESE1), wherein the ESE1 is issued for a duration to override contending signals on the embedded high speed serial interface data lines.

Example 82 includes the subject matter of Example 81. In this example, the ESE1 is issued to terminate a Universal Serial Bus session.

Example 83 includes the subject matter of any combination of Examples 81-82. In this example, the ESE1 is issued to terminate a Universal Serial Bus (USB) session and resolve an unrecognizable embedded high speed serial interface event.

Example 84 includes the subject matter of any combination of Examples 81-83. In this example, a number of ESE1 issuing attempts are limited to a predetermined number of times.

Example 85 includes the subject matter of any combination of Examples 81-84. In this example, the embedded high speed serial interface device is an upstream embedded high speed serial interface port. The system further includes a downstream embedded high speed serial interface port to enter a suspend state upon issuing an ESE1 by the upstream embedded high speed serial interface port the predetermined number of times.

Example 86 includes the subject matter of any combination of Examples 81-85. In this example, the embedded high speed serial interface device is a downstream embedded high speed serial interface port to be communicatively coupled to an upstream embedded high speed serial interface port. Transmission of the ESE1 by the embedded high speed serial interface downstream port is performed upon power on, when directed to perform a soft connect by the upstream port, or any combination thereof.

Example 87 includes the subject matter of any combination of Examples 81-86. In this example, the embedded high speed serial interface device is an upstream embedded high speed serial interface port. The ESE1 signaling is issued from the embedded high speed serial interface upstream port to perform a soft connect of a downstream embedded high speed serial interface port.

Example 88 includes the subject matter of any combination of Examples 81-87. In this example, the embedded high speed serial interface device is an embedded high speed serial interface repeater. The ESE1 signaling is issued from the embedded high speed serial interface repeater if directed to perform a device disconnect from either an upstream embedded high speed serial interface port or a downstream embedded high speed serial interface port.

Example 89 includes the subject matter of any combination of Examples 81-88. In this example, the embedded high speed serial interface device is a downstream embedded high speed serial interface repeater. The ESE1 signaling is issued from the downstream embedded high speed serial interface repeater to a downstream embedded high speed serial interface port upon detection of a host disconnect.

Example 90 includes the subject matter of any combination of Examples 81-89. In this example, the embedded high speed serial interface device logic is to declare ESE1 reception at an embedded high speed serial interface port, and remain in or transitioning to a power-on state occurring before the reception of the ESE1.

Example 91 includes a computer-readable medium. The computer-readable medium may be a non-transitory computer-readable medium in some examples. The computer-readable medium includes code that, when executed, cause a processing device to execute the method of any combination of Examples 71-80.

Example 92 includes an apparatus for explicit control message signaling. The apparatus includes a means for monitoring line states of a pair of embedded high speed serial interface data lines. The apparatus also includes a means for issuing an extended single-ended one (ESE1), wherein the ESE1 is issued for a duration to override contending signals on the embedded high speed serial interface data lines.

Example 93 incorporates the subject matter of Example 92. In this example, the ESE1 is issued to terminate a Universal Serial Bus session.

Example 94 incorporates the subject matter of any combination of Examples 92-93. In this example, the ESE1 is issued to terminate a Universal Serial Bus (USB) session and resolve an unrecognizable embedded high speed serial interface event.

Example 95 describes an apparatus for explicit control message signaling. The apparatus includes a means for performing the method according to any combination of Examples 71-80.

Example 96 describes a method for explicit control message signaling. The method includes issuing a single-ended control message on each of a pair of embedded high speed serial interface data lines. The method also includes detecting voltage at a squelch detector exceeding a voltage threshold. The method further includes differentiating the control message from skew associated with a differential signal at an embedded high speed serial interface2 receiver.

Example 97 incorporates the subject matter of Example 96. In this example, differentiating the control message from a differential signal includes detecting whether a transition occurring on each of the embedded high speed serial interface data lines are in the same direction, or in opposite directions. If a transition occurred on both the embedded high speed serial interface data lines in the same direction, the method includes determining that the transition is associated with a control message.

Example 98 incorporates the subject matter of any combination of Examples 96-97. In this example, upon determining that the transition is associated with a control message, the method includes suppressing the control message from being communicated on a Universal Serial Bus (USB) port.

Example 99 incorporates the subject matter of any combination of Examples 96-98. In this example, differentiating the control message from a differential signal includes filtering an output of a single-ended one signal detector at a digital filter, and filtering non-squelched signals which are the output of a squelch detector at an analog to digital filter. Differentiating the control message from a differential signal further includes issuing the control message if a signal passes the digital filter and the analog to digital filter, and generating a control voltage to gate a transceiver to forward contention information over a Universal Serial Bus.

Example 100 incorporates the subject matter of any combination of Examples 96-99. In this example, the digital filter and the analog filter are components of a control circuit of an embedded high speed serial interface repeater.

Example 101 incorporates the subject matter of any combination of Examples 96-100. In this example, differential signals are determined at the embedded high speed serial interface repeater by a non-return-to-zero condition.

Example 102 incorporates the subject matter of any combination of Examples 96-101. In this example, the non-return-to-zero condition indicates a binary 1 with a positive voltage, and a binary 2 with a negative voltage.

Example 103 incorporates the subject matter of any combination of Examples 96-102. In this example, detecting voltage at a squelch detector exceeding a voltage threshold includes detecting a combined voltage of each of the embedded high speed serial interface data lines.

Example 104 incorporates the subject matter of any combination of Examples 96-103. In this example, the predetermined threshold is adjustable.

Example 105 incorporates the subject matter of any combination of Examples 96-104. In this example, the skew is a magnitude of a time difference between two signals on each of the embedded high speed serial interface data lines which are intended to occur at the same time.

Example 106 describes a system for explicit control message signaling. The system includes a pair of embedded high speed serial interface data lines. The system includes an embedded high speed serial interface port including logic, at least partially including hardware logic, to issue a single-ended control message on each of the embedded high speed serial interface data lines. The system further includes an embedded high speed serial interface repeater including logic, at least partially including hardware logic, to detect voltage at a squelch detector exceeding a voltage threshold, and differentiate the control message from skew associated with a differential signal.

Example 107 incorporates the subject matter of Example 106. In this example, the embedded high speed serial interface repeater logic is to detect whether a transition occurring on each of the embedded high speed serial interface data lines are in the same direction, or in opposite directions. If a transition occurred on both the embedded high speed serial interface data lines in the same direction, the embedded high speed serial interface repeater logic is to determine that the transition is associated with a control message.

Example 108 incorporates the subject matter of any combination of Examples 106-107. In this example, upon determination that the transition is associated with a control message, the embedded high speed serial interface repeater logic is to suppress the control message from being communicated on a Universal Serial Bus (USB) port.

Example 109 incorporates the subject matter of any combination of Examples 106-108. In this example, the system further includes a digital filter to filter an output of a single-ended one signal detector, and an analog to digital filter to filter non-squelched signals which are the output of a squelch detector.

Example 110 incorporates the subject matter of any combination of Examples 106-109. In this example, the embedded high speed serial interface repeater logic is to issue the control message if a signal passes the digital filter and the analog to digital filter. The embedded high speed serial interface repeater logic is further to generate a control voltage to gate a transceiver to forward contention information over a Universal Serial Bus.

Example 111 incorporates the subject matter of any combination of Examples 106-110. In this example, the digital filter and the analog filter are components of a control circuit of an embedded high speed serial interface repeater.

Example 112 incorporates the subject matter of any combination of Examples 106-111. In this example, differential signals are determined at the embedded high speed serial interface repeater by a non-return-to-zero condition, and the non-return-to-zero condition indicates a binary 1 with a positive voltage, and a binary 2 with a negative voltage.

Example 113 incorporates the subject matter of any combination of Examples 106-112. In this example, the embedded high speed serial interface repeater logic is to detect a combined voltage of each of the embedded high speed serial interface data lines at a squelch detector exceeding the voltage threshold.

Example 114 incorporates the subject matter of any combination of Examples 106-113. In this example, the predetermined threshold is adjustable.

Example 115 incorporates the subject matter of any combination of Examples 106-114. In this example, the skew is a magnitude of a time difference between two signals on each of the embedded high speed serial interface data lines which are intended to occur at the same time.

Example 116 describes a computer-readable medium. In some cases, the computer-readable medium may be a non-transitory computer-readable medium. The computer-readable medium includes code that, when executed by a processor, cause the processor to issue a single-ended control message on each of a pair of embedded high speed serial interface data lines, and detect voltage at a squelch detector exceeding a voltage threshold. The code when executed by a processor, cause the processor to also differentiate the control message from skew associated with a differential signal at an embedded high speed serial interface2 receiver.

Example 117 incorporates the subject matter of Example 116. In this example, the computer-readable medium further includes code, when executed, cause a processing device to detect whether a transition occurring on each of the embedded high speed serial interface data lines are in the same direction, or in opposite directions. If a transition occurred on both the embedded high speed serial interface data lines in the same direction, the computer-readable medium further includes code, when executed, cause a processing device to determine that the transition is associated with a control message.

Example 118 incorporates the subject matter of any combination of Examples 116-117. In this example, upon a determination that the transition is associated with a control message, the computer-readable medium includes code, that when executed by the processing device, cause the processing device to suppress the control message from being communicated on a Universal Serial Bus (USB) port.

Example 118 incorporates the subject matter of any combination of Examples 116-117. In this example, the computer-readable medium includes code, that when executed by the processing device, cause the processing device to filter an output of a single-ended one signal detector at a digital filter, and filter non-squelched signals which are the output of a squelch detector at an analog to digital filter, the computer-readable medium further includes code, that when executed by the processing device, cause the processing device to issue the control message if a signal passes the digital filter and the analog to digital filter, and generate a control voltage to gate a transceiver to forward contention information over a Universal Serial Bus.

Example 119 incorporates the subject matter of any combination of Examples 116-118. In this example, the digital filter and the analog filter are components of a control circuit of an embedded high speed serial interface repeater.

Example 120 incorporates the subject matter of any combination of Examples 116-119. In this example, the digital filter and the analog filter are components of a control circuit of an embedded high speed serial interface repeater.

Example 121 incorporates the subject matter of any combination of Examples 116-120. In this example, differential signals are determined at the embedded high speed serial interface repeater by a non-return-to-zero condition.

Example 122 incorporates the subject matter of any combination of Examples 116-121. In this example, the non-return-to-zero condition indicates a binary 1 with a positive voltage, and a binary 2 with a negative voltage.

Example 123 incorporates the subject matter of any combination of Examples 116-122. In this example, the computer-readable medium includes code, that when executed by the processing device, cause the processing device to detect a combined voltage of each of the embedded high speed serial interface data lines.

Example 124 incorporates the subject matter of any combination of Examples 116-123. In this example, the predetermined threshold is adjustable.

Example 125 incorporates the subject matter of any combination of Examples 116-124. In this example, the skew is a magnitude of a time difference between two signals on each of the embedded high speed serial interface data lines which are intended to occur at the same time.

Example 126 describes a computer-readable medium. In some cases, the computer-readable medium may be a non-transitory computer-readable medium. The computer-readable medium includes code that, when executed by a processor, cause the processor to execute the method of any combination of Examples 96-105.

Example 127 describes an apparatus for explicit control message signaling. The apparatus includes a means for issuing a single-ended control message on each of a pair of embedded high speed serial interface data lines. The apparatus also includes a means for detecting voltage at a squelch detector exceeding a voltage threshold. The apparatus further includes a means for differentiating the control message from skew associated with a differential signal at an embedded high speed serial interface2 receiver.

Example 128 incorporates the subject matter of Example 127. In this example, differentiating the control message from a differential signal is performed by means including a means for detecting whether a transition occurring on each of the embedded high speed serial interface data lines are in the same direction, or in opposite directions. Differentiating the control message from a differential signal is also performed by means including a means for determining that the transition is associated with a control message if a transition occurred on both the embedded high speed serial interface data lines in the same direction.

Example 129 incorporates the subject matter of any combination of Examples 127-128. In this example, the apparatus further includes a means for suppressing the control message from being communicated on a Universal Serial Bus (USB) port.

Example 130 describes an apparatus for explicit control message signaling. In this example, the apparatus includes a means for performing the method according to any combination of the Examples 96-105.

Example 131 describes a method for explicit control message signaling. In this example, the method includes issuing a single-ended one (SE1) on each of a pair of embedded high speed serial interface data lines, the SE1 indicating a register access protocol (RAP) message follows the SE1. The method further includes communicating data indicating via the embedded high speed serial interface data lines. The data includes a battery charging indication, an on-the-go indication, or any combination thereof.

Example 132 incorporates the subject matter of Example 131. In this example, the method further includes detecting a connected device, selecting RAP data to transmit in the RAP message through an embedded high speed serial interface transceiver of a computing device to an embedded high speed serial interface port of the computing device via the embedded high speed serial interface data lines. The method also includes accessing registers of the connected device based on the RAP message.

Example 133 incorporates the subject matter of any combination of Examples 131-132. In this example, the RAP message further includes Universal Serial Bus (USB) register indications from a repeater to an embedded high speed serial interface system-on-chip (SOC).

Example 134 incorporates the subject matter of any combination of Examples 131-133. In this example, the battery charging indication includes an indication of a type of device connected to a computing device including an embedded high speed serial interface port coupled to the embedded high speed serial interface data lines.

Example 135 incorporates the subject matter of any combination of Examples 131-134. In this example, the charging type includes a dedicated charging device (DCD), a charging downstream port (CDP), a standard downstream port (SDP), or any combination thereof.

Example 136 incorporates the subject matter of any combination of Examples 131-135. In this example, the on-the-go indication includes an indication of role a computing device including an embedded high speed serial interface port coupled to the embedded high speed serial interface data lines.

Example 137 incorporates the subject matter of any combination of Examples 131-136. In this example, the role of the computing device includes a host computing device role or a peripheral computing device role.

Example 138 incorporates the subject matter of any combination of Examples 131-137. In this example, the role of the computing device may be changed dynamically based on changes of the on-the-go indication.

Example 139 incorporates the subject matter of any combination of Examples 131-138. In this example, the method further includes enabling battery charging indication detection upon power up and before Universal Serial Bus operations.

Example 140 incorporates the subject matter of any combination of Examples 131-139. In this example, the method further includes enabling battery charging indication detection during suspend state, idle, or any combination thereof.

Example 141 describes a system for explicit control message signaling. The system includes a pair of embedded high speed serial interface data lines. The system further includes logic, at least partially including hardware logic, to issue a single-ended one (SE1) on each of the embedded high speed serial interface data lines, the SE1 indicating a register access protocol (RAP) message follows the SE1. The logic is further configured to communicate data via the embedded high speed serial interface data lines. The data is to indicate one or more of a battery charging indication, an on-the-go indication, or any combination thereof.

Example 142 incorporates the subject matter of Example 141. In this example, the system further includes logic, at least partially including hardware logic, to detect a connected device, select RAP data to transmit in the RAP message through an embedded high speed serial interface transceiver of a computing device to an embedded high speed serial interface port of the computing device via the embedded high speed serial interface data lines, and access registers of the connected device based on the RAP message.

Example 143 incorporates the subject matter of any combination of Examples 141-142. In this example, the system further includes an embedded high speed serial interface repeater, and an embedded high speed serial interface system-on-chip (SOC), wherein the RAP message further includes a Universal Serial Bus (USB) register indications from the repeater to the embedded high speed serial interface system-on-chip (SOC).

Example 144 incorporates the subject matter of any combination of Examples 141-143. In this example, the system further includes a computing device communicatively coupled to the system, wherein the battery charging indication includes an indication of a type of the communicatively coupled device an embedded high speed serial interface port of the system via the embedded high speed serial interface data lines.

Example 145 incorporates the subject matter of any combination of Examples 141-144. In this example, the charging type includes a dedicated charging device (DCD), a charging downstream port (CDP), a standard downstream port (SDP), or any combination thereof.

Example 146 incorporates the subject matter of any combination of Examples 141-145. In this example, the on-the-go indication includes an indication of role a computing device of the system.

Example 147 incorporates the subject matter of any combination of Examples 141-146. In this example, the role of the computing device includes a host computing device role or a peripheral computing device role.

Example 148 incorporates the subject matter of any combination of Examples 141-147. In this example, the role of the computing device may be changed dynamically based on changes of the on-the-go indication.

Example 149 incorporates the subject matter of any combination of Examples 141-148. In this example, further including logic, at least partially including hardware logic, to enable battery charging indication detection upon power up and before Universal Serial Bus operations.

Example 150 incorporates the subject matter of any combination of Examples 141-149. In this example, further including logic, at least partially including hardware logic, to enable battery charging indication detection during suspend state, idle, or any combination thereof.

Example 151 describes a computer-readable medium. In some cases, the computer-readable medium may be a non-transitory computer-readable medium. The computer-readable medium includes code that, when executed by a processor, cause the processor to issue a single-ended one (SE1) on each of a pair of embedded high speed serial interface data lines, the SE1 indicating a register access protocol (RAP) message follows the SE1. The computer-readable medium includes code that, when executed by a processor, cause the processor to communicate data via the embedded high speed serial interface data lines. The data is to indicate one or more of a battery charging indication, an on-the-go indication, or any combination thereof.

Example 152 incorporates the subject matter of Example 151. In this example, the computer-readable medium further includes code, when executed, cause the processing device to detect a connected device, selecting RAP data to transmit in the RAP message through an embedded high speed serial interface transceiver of a computing device to an embedded high speed serial interface port of the computing device via the embedded high speed serial interface data lines. The computer-readable medium further includes code, when executed, cause the processing device to access registers of the connected device based on the RAP message.

Example 153 incorporates the subject matter of any combination of Examples 151-152. In this example, the RAP message further includes Universal Serial Bus (USB) register indications from a repeater to an embedded high speed serial interface system-on-chip (SOC).

Example 154 incorporates the subject matter of any combination of Examples 151-153. In this example, the battery charging indication includes an indication of a type of device connected to a computing device including an embedded high speed serial interface port coupled to the embedded high speed serial interface data lines.

Example 155 incorporates the subject matter of any combination of Examples 151-154. In this example, the charging type includes a dedicated charging device (DCD), a charging downstream port (CDP), a standard downstream port (SDP), or any combination thereof.

Example 156 incorporates the subject matter of any combination of Examples 151-155. In this example, the on-the-go indication includes an indication of role a computing device of the system.

Example 157 incorporates the subject matter of any combination of Examples 151-156. In this example, the role of the computing device includes a host computing device role or a peripheral computing device role.

Example 158 incorporates the subject matter of any combination of Examples 151-157. In this example, the role of the computing device may be changed dynamically based on changes of the on-the-go indication.

Example 159 incorporates the subject matter of any combination of Examples 151-158. In this example, the computer-readable medium further includes code, when executed, cause the processing device to enable battery charging indication detection upon power up and before Universal Serial Bus operations.

Example 160 incorporates the subject matter of any combination of Examples 151-159. In this example, the computer-readable medium further includes code to direct the processing device to enable battery charging indication detection during suspend state, idle, or any combination thereof.

Example 161 describes a computer-readable medium. In some cases, the computer-readable medium may be a non-transitory computer-readable medium. The computer-readable medium includes code that, when executed by a processor, cause the processor to execute the method of any combination of examples 131-140.

Example 162 describes an apparatus for explicit control message signaling. The apparatus includes a means to issue a single-ended one (SE1) on each of a pair of embedded high speed serial interface data lines, the SE1 indicating a register access protocol (RAP) message follows the SE1. The apparatus includes a means to a means to communicate data via the embedded high speed serial interface data lines. The data includes one or more of a battery charging indication, an on-the-go indication, or any combination thereof.

Example 163 incorporates the subject matter of Example 162. In this example, the apparatus further includes a means to detect a connected device, selecting RAP data to transmit in the RAP message through an embedded high speed serial interface transceiver of a computing device to an embedded high speed serial interface port of the computing device via the embedded high speed serial interface data lines. The apparatus also includes a means to access registers of the connected device based on the RAP message.

Example 164 incorporates the subject matter of any combination of Examples 162-163. In this example, the RAP message further includes Universal Serial Bus (USB) register indications from a repeater to an embedded high speed serial interface system-on-chip (SOC).

Example 165 describes an apparatus for explicit control message signaling. The apparatus includes a means for performing the method of any of the Examples 131-140.

Example 166 describes a method for explicit control message signaling. The method includes issuing a single-ended one (SE1) on each of a pair of embedded high speed serial interface data lines, and detecting whether an active window exists on either a positive embedded high speed serial interface data line or on a negative embedded high speed serial interface data line.

Example 167 incorporates the subject matter of Example 166. In this example, the method includes issuing a single-ended zero (SE0) on each of the embedded high speed serial interface data lines.

Example 168 incorporates the subject matter of any combination of Examples 166-167. In this example, the method further includes detecting an active window occurring on a positive embedded high speed serial interface data line, and determining a device state to be non-polarity inverted.

Example 169 incorporates the subject matter of any combination of Examples 166-168. In this example, the method further includes transmitting a digital ping on the positive embedded high speed serial interface data line.

Example 170 incorporates the subject matter of any combination of Examples 166-169. In this example, the method further includes receiving the digital ping on from the positive embedded high speed serial interface data line at an embedded high speed serial interface port. In this example, the method also includes declaring that no polarity inversion exists on the embedded high speed serial interface data lines.

Example 171 incorporates the subject matter of any combination of Examples 166-170. In this example, the method further includes detecting an active window occurring on a negative embedded high speed serial interface data line. In this example, the method further includes determining a device state to be polarity inverted.

Example 172 incorporates the subject matter of any combination of Examples 166-171. In this example, the method further includes transmitting a digital ping on the negative embedded high speed serial interface data line.

Example 173 incorporates the subject matter of any combination of Examples 166-172. In this example, the method further includes receiving the digital ping from the negative embedded high speed serial interface data line at an embedded high speed serial interface port. The method also includes declaring that polarity inversion exists on the embedded high speed serial interface data lines.

Example 174 incorporates the subject matter of any combination of Examples 166-173. In this example, polarity inversion is due to polarity agnostic Universal Serial Bus plugs to be received by a computing device having the embedded high speed serial interface data lines.

Example 175 incorporates the subject matter of any combination of Examples 166-174. In this example, polarity inversion is due to polarity inversion of the embedded high speed serial interface data lines within a computing device.

Example 176 describes a system for explicit control message signaling. The system includes a pair of embedded high speed serial interface data lines. The system also includes an embedded high speed serial interface initiator component having logic, at least partially including hardware logic, to issue a single-ended one (SE1) on each of a pair of embedded high speed serial interface data lines. The system further includes an embedded high speed serial interface recipient component having logic, at least partially including hardware logic, to detect whether an active window exists on either a positive embedded high speed serial interface data line or on a negative embedded high speed serial interface data line.

Example 177 incorporates the subject matter of Example 176. In this example, the system further includes logic, at least partially including hardware logic, of the embedded high speed serial interface initiator component to issue a single-ended zero (SE0) on each of the embedded high speed serial interface data lines.

Example 178 incorporates the subject matter of any combination of Examples 176-177. In this example, the embedded high speed serial interface recipient component is to detect an active window occurring on a positive embedded high speed serial interface data line, and determine a device state to be non-polarity inverted.

Example 179 incorporates the subject matter of any combination of Examples 176-178. In this example, the embedded high speed serial interface recipient component is to transmit a digital ping on the positive embedded high speed serial interface data line.

Example 180 incorporates the subject matter of any combination of Examples 176-179. In this example, the embedded high speed serial interface initiator component is to receive the digital ping on from the positive embedded high speed serial interface data line at an embedded high speed serial interface port, and to declare that no polarity inversion exists on the embedded high speed serial interface data lines.

Example 181 incorporates the subject matter of any combination of Examples 176-180. In this example, the embedded high speed serial interface recipient component is to detect an active window occurring on a negative embedded high speed serial interface data line, and determine a device state to be polarity inverted.

Example 182 incorporates the subject matter of any combination of Examples 176-181. In this example, the embedded high speed serial interface recipient component is to transmit a digital ping on the negative embedded high speed serial interface data line.

Example 183 incorporates the subject matter of any combination of Examples 176-182. In this example, the embedded high speed serial interface initiator component is to receive the digital ping from the negative embedded high speed serial interface data line at an embedded high speed serial interface port, and declare that polarity inversion exists on the embedded high speed serial interface data lines.

Example 184 incorporates the subject matter of any combination of Examples 176-183. In this example, polarity inversion is due to polarity agnostic Universal Serial Bus plugs to be received by a computing device having the embedded high speed serial interface data lines.

Example 185 incorporates the subject matter of any combination of Examples 176-184. In this example, polarity inversion is due to polarity inversion of the embedded high speed serial interface data lines within a computing device.

Example 186 describes a computer-readable medium. In some cases, the computer-readable medium may be a non-transitory computer-readable medium. The computer-readable medium includes code that, when executed by a processor, cause the processor to issue a single-ended one (SE1) on each of a pair of embedded high speed serial interface data lines. The computer-readable medium further includes code that, when executed by a processor, cause the processor to detect whether an active window exists on either a positive embedded high speed serial interface data line or on a negative embedded high speed serial interface data line.

Example 187 incorporates the subject matter of Example 186. In this example, the computer-readable medium further includes code that, when executed by a processor, cause the processor to issue a single-ended zero (SE0) on each of the embedded high speed serial interface data lines.

Example 188 incorporates the subject matter of any combination of Examples 186-187. In this example, the computer-readable medium further includes code that, when executed by a processor, cause the processor to detecting an active window occurring on a positive embedded high speed serial interface data line, and determining a device state to be non-polarity inverted.

Example 189 incorporates the subject matter of any combination of Examples 186-188. In this example, the computer-readable medium further includes code that, when executed by a processor, cause the processor to transmit digital ping on the positive embedded high speed serial interface data line.

Example 190 incorporates the subject matter of any combination of Examples 186-189. In this example, the computer-readable medium further includes code that, when executed by a processor, cause the processor to receive the digital ping on from the positive embedded high speed serial interface data line at an embedded high speed serial interface port, and declare that no polarity inversion exists on the embedded high speed serial interface data lines.

Example 191 incorporates the subject matter of any combination of Examples 186-190. In this example, the computer-readable medium further includes code that, when executed by a processor, cause the processor to detect an active window occurring on a negative embedded high speed serial interface data line, and determine a device state to be polarity inverted.

Example 192 incorporates the subject matter of any combination of Examples 186-191. In this example, the computer-readable medium further includes code that, when executed by a processor, cause the processor to transmit a digital ping on the negative embedded high speed serial interface data line.

Example 193 incorporates the subject matter of any combination of Examples 186-192. In this example, the computer-readable medium further includes code that, when executed by a processor, cause the processor to receive the digital ping from the negative embedded high speed serial interface data line at an embedded high speed serial interface port, and declare that polarity inversion exists on the embedded high speed serial interface data lines.

Example 194 incorporates the subject matter of any combination of Examples 186-193. In this example, the polarity inversion is due to polarity agnostic Universal Serial Bus plugs to be received by a computing device having the embedded high speed serial interface data lines.

Example 195 incorporates the subject matter of any combination of Examples 186-194. In this example, the polarity inversion is due to polarity inversion of the embedded high speed serial interface data lines within a computing device.

Example 196 describes a computer-readable medium. In some cases, the computer-readable medium may be a non-transitory computer-readable medium. The computer-readable medium includes code that, when executed by a processor, cause the processor to execute the method of any combination of Examples 166-175.

Example 197 describes an apparatus for explicit control message signaling. The apparatus includes a means to issue a single-ended one (SE1) on each of a pair of embedded high speed serial interface data lines. The apparatus further includes a means to detect whether an active window exists on either a positive embedded high speed serial interface data line or on a negative embedded high speed serial interface data line.

Example 198 incorporates the subject matter of Example 197. In this example, the apparatus further includes a means for issuing a single-ended zero (SE0) on each of the embedded high speed serial interface data lines.

Example 199 incorporates the subject matter of any combination of Examples 197-198. In this example, the apparatus further includes a means to detect an active window occurring on a negative embedded high speed serial interface data line, and a means to determine a device state to be polarity inverted.

Example 200 describes an apparatus for explicit control message signaling. The apparatus includes a means for performing the method of any combination of Examples 166-175.

Example 201 describes an embedded high speed serial interface port. The embedded high speed serial interface port includes a controller to issue a single-ended one (SE1) signal, the SE1 indicating a register access protocol (RAP) message follows the SE1 signal. The embedded high speed serial interface port includes a transceiver to access the register of the embedded high speed serial interface component based on the RAP message.

Example 202 incorporates the subject matter of Example 201. In this example, the embedded high speed serial interface port issues the SE1 on data lines including a pair of embedded high speed serial interface data lines. The pair of embedded high speed serial interface data lines includes a positive embedded high speed serial interface data line (eD+) and a negative embedded high speed serial interface data line (eD−).

Example 203 incorporates the subject matter of any combination of Examples 201-202. In this example, the eD+ data line is to carry a clock signal for the RAP message. The eD− data line is to carry instructions of the RAP message including a read operation, a write operation, a clear operation, any combination thereof.

Example 204 incorporates the subject matter of any combination of Examples 201-203. In this example, the embedded high speed serial interface port further includes a RAP initiator, wherein the SE1 signal is to be issued by the RAP initiator.

Example 205 incorporates the subject matter of any combination of Examples 201-204. In this example, the SE1 signal is to be issued by a RAP initiator in a RAP receptor protocol.

Example 206 incorporates the subject matter of any combination of Examples 201-205. In this example, the embedded high speed serial interface port is a downstream port comprising a RAP initiator, wherein the RAP initiator is to issue the SE1 upstream.

Example 207 incorporates the subject matter of any combination of Examples 201-206. In this example, following the SE1 signal, the embedded high speed serial interface port is to forward a clock signal and forward a two-bit command message.

Example 208 incorporates the subject matter of any combination of Examples 201-207. In this example, the RAP information is related to power on, idle, suspend state, connect, disconnect, reset, or any combination thereof.

Example 209 incorporates the subject matter of any combination of Examples 201-208. In this example, the SE1 signal is to be issued in-band to embedded high speed serial interface protocol.

Example 210 incorporates the subject matter of any combination of Examples 201-209. In this example, the RAP message includes a command message containing a clock and an indication of a type of operation to be performed at the register.

Example 211 describes an embedded high speed serial interface port. The embedded high speed serial interface port includes a detector to detect an idle state for a first predetermined period of time. The embedded high speed serial interface port includes a transmitter to transmit a control message within a second predetermined period of time subsequent to the first predetermined period of time. The embedded high speed serial interface port includes a controller to determine entry into either an idle state or a reset state.

Example 212 incorporates the subject matter of Example 211. In this example, to determine entry into either an idle state or a reset state, the controller of the embedded high speed serial interface port is to remove voltage pull-downs. The controller of the embedded high speed serial interface port is to sample data transfer rate after the voltage pull-downs are removed, and issue a digital ping if a state of the data lines has changed after removing the voltage pull-downs. Further, the controller is to determine entry into either an idle state or a reset state based on whether a digital ping has been issued.

Example 213 incorporates the subject matter of any combination of Examples 210-211. In this example, the first predetermined period of time is between about 0 milliseconds and about 3 milliseconds.

Example 214 incorporates the subject matter of any combination of Examples 210-213. In this example, he second predetermined period of time between about 3 milliseconds and about 3.125 microseconds after initially detection of the idle state.

Example 215 incorporates the subject matter of any combination of Examples 210-214. In this example, the controller of the embedded high speed serial interface port is to identify a data line state to be an idle state if the line data line state remains unchanged after removing the voltage pull-downs.

Example 216 incorporates the subject matter of any combination of Examples 210-215. In this example, the transmitter of the embedded high speed serial interface port is to initialize the signaling for entry into either the reset state or the idle state.

Example 217 incorporates the subject matter of any combination of Examples 210-216. In this example, the controller of the embedded high speed serial interface port is to declare entry into the reset state if no digital ping is detected.

Example 218 incorporates the subject matter of any combination of Examples 210-217. In this example, the controller of the embedded high speed serial interface port is to declare entry into the idle state if a digital ping is detected.

Example 219 incorporates the subject matter of any combination of Examples 210-218. In this example, the control message is provided in band as opposed to via out-of-band.

Example 220 incorporates the subject matter of any combination of Examples 210-219. In this example, the transmitter of the embedded high speed serial interface port is to issue signals in an embedded high speed interface protocol.

Example 221 describes an embedded high speed serial interface device. The embedded high speed serial interface device includes a controller to monitor line states, and a transmitter to issue an extended single-ended one (ESE1), wherein the ESE1 is issued for a duration to override contending signals.

Example 222 incorporates the subject matter of Example 221. In this example, the ESE1 is issued to terminate a Universal Serial Bus session.

Example 223 incorporates the subject matter of any combination of Examples 221-222. In this example, the ESE1 is issued to resolve an unrecognizable embedded high speed serial interface event.

Example 224 incorporates the subject matter of any combination of Examples 221-223. In this example, a number of ESE1 issuing attempts are limited to a predetermined number of times.

Example 225 incorporates the subject matter of any combination of Examples 221-224. In this example, the embedded high speed serial interface device is an upstream embedded high speed serial interface port.

Example 226 incorporates the subject matter of any combination of Examples 221-225. In this example, the embedded high speed serial interface device is a downstream embedded high speed serial interface port. Transmission of the ESE1 by the embedded high speed serial interface downstream port is performed upon power on, when directed to perform a soft connect, or any combination thereof.

Example 227 incorporates the subject matter of any combination of Examples 221-226. In this example, the embedded high speed serial interface device is an upstream embedded high speed serial interface port. The ESE1 signaling is issued from the embedded high speed serial interface upstream port to perform a soft connect.

Example 228 incorporates the subject matter of any combination of Examples 221-227. In this example, the embedded high speed serial interface device is an embedded high speed serial interface repeater. The ESE1 signaling is issued from the embedded high speed serial interface repeater if directed to perform a device disconnect.

Example 229 incorporates the subject matter of any combination of Examples 221-228. In this example, the embedded high speed serial interface device is a downstream embedded high speed serial interface repeater. The ESE1 signaling is issued from the downstream embedded high speed serial interface repeater upon detection of a host disconnect.

Example 230 incorporates the subject matter of any combination of Examples 221-229. In this example, the controller is to declare ESE1 reception at an embedded high speed serial interface port, and remain in or transitioning to a power-on state occurring before the reception of the ESE1.

Example 231 describes an embedded high speed serial interface repeater. The embedded high speed serial interface repeater includes a detector to detect voltage at a squelch detector exceeding a voltage threshold, and a controller to differentiate the control message from skew associated with a differential signal.

Example 232 incorporates the subject matter of Example 231. In this example, the detector is to detect whether a transition occurs in the same direction, or in opposite directions. If a transition occurred on both the embedded high speed serial interface data lines in the same direction, the controller is to determine that the transition is associated with a control message.

Example 233 incorporates the subject matter of any combination of Examples 231-232. In this example, upon determination that the transition is associated with a control message, the controller is to suppress the control message from being communicated on a Universal Serial Bus (USB) port.

Example 234 incorporates the subject matter of any combination of Examples 231-233. In this example, the embedded high speed serial interface repeater further includes a digital filter to filter an output of a single-ended one signal detector. The embedded high speed serial interface repeater further includes an analog to digital filter to filter non-squelched signals which are the output of a squelch detector.

Example 235 incorporates the subject matter of any combination of Examples 231-234. In this example, the controller is to issue the control message if a signal passes the digital filter and the analog to digital filter. The controller is further configured to generate a control voltage to gate a transceiver to forward contention information.

Example 236 incorporates the subject matter of any combination of Examples 231-235. In this example, the digital filter and the analog filter are components of a control circuit of the embedded high speed serial interface repeater.

Example 237 incorporates the subject matter of any combination of Examples 231-236. In this example, differential signals are determined at the embedded high speed serial interface repeater by a non-return-to-zero condition, and wherein the non-return-to-zero condition indicates a binary 1 with a positive voltage, and a binary 2 with a negative voltage.

Example 238 incorporates the subject matter of any combination of Examples 231-237. In this example, he controller is to detect a combined voltage of each of the embedded high speed serial interface data lines at a squelch detector exceeding the voltage threshold.

Example 239 incorporates the subject matter of any combination of Examples 231-238. In this example, the predetermined threshold is adjustable.

Example 240 incorporates the subject matter of any combination of Examples 231-239. In this example, the skew is a magnitude of a time difference between two signals which are intended to occur at the same time.

Example 241 describes an embedded high speed serial interface system-on-chip. The embedded high speed serial interface system-on-chip includes a controller to issue a single-ended one (SE1), the SE1 indicating a register access protocol (RAP) message follows the SE1. The embedded high speed serial interface system-on-chip includes a transceiver communicate data indicating one or more of a battery charging indication, an on-the-go indication, or any combination thereof.

Example 242 incorporates the subject matter of Example 241. In this example, the controller is to detect a connected device, select RAP data to transmit in the RAP message through the embedded high speed serial interface transceiver, and access registers of the connected device based on the RAP message.

Example 243 incorporates the subject matter of any combination of Examples 241-242. In this example, the RAP message further comprises Universal Serial Bus (USB) register indications.

Example 244 incorporates the subject matter of any combination of Examples 241-243. In this example, the battery charging indication includes an indication of a type of device.

Example 245 incorporates the subject matter of any combination of Examples 241-244. In this example, the charging type includes a dedicated charging device (DCD), a charging downstream port (CDP), a standard downstream port (SDP), or any combination thereof.

Example 246 incorporates the subject matter of any combination of Examples 241-245. In this example, the on-the-go indication comprises a role indication of the embedded high speed serial interface system-on-chip.

Example 247 incorporates the subject matter of any combination of Examples 241-246. In this example, the role includes a host computing device role, and a peripheral computing device role.

Example 248 incorporates the subject matter of any combination of Examples 241-247. In this example, the role of the computing device may be changed dynamically based on changes of the on-the-go indication.

Example 249 incorporates the subject matter of any combination of Examples 241-248. In this example, the controller is to enable battery charging indication detection upon power up and before Universal Serial Bus operations.

Example 250 incorporates the subject matter of any combination of Examples 241-249. In this example, the controller is to enable battery charging indication detection during suspend state, idle, or any combination thereof.

Example 251 describes an embedded high speed serial interface component. The embedded high speed serial interface component includes a receiver a single-ended one (SE1), a detector to detect whether an active window exists.

Example 252 incorporates the subject matter of Example 251. In this example, the receiver is further configured to receive a single-ended zero (SE0) on each of a pair of embedded high speed serial interface data lines.

Example 253 incorporates the subject matter of any combination of Examples 251-252. In this example, the detector is configured to detect an active window occurring having positive polarity. The detector is further configured to determine a device state to be non-polarity inverted.

Example 254 incorporates the subject matter of any combination of Examples 251-253. In this example, the embedded high speed serial interface component further includes a transmitter to transmit a positive polarity digital ping.

Example 255 incorporates the subject matter of any combination of Examples 251-254. In this example, the digital ping indicates that no polarity inversion exists.

Example 256 incorporates the subject matter of any combination of Examples 251-255. In this example, the detector is configured to detect an active window occurring on having negative polarity. The detector is further configured to determine a device state to be polarity inverted.

Example 257 incorporates the subject matter of any combination of Examples 251-256. In this example, the embedded high speed serial interface component further includes a transmitter to transmit a negative polarity digital ping.

Example 258 incorporates the subject matter of any combination of Examples 251-257. In this example, the digital ping indicates that polarity inversion exists.

Example 259 incorporates the subject matter of any combination of Examples 251-258. In this example, polarity inversion is due to polarity agnostic Universal Serial Bus plugs to be received by a computing device having the embedded high speed serial interface data lines.

Example 260 incorporates the subject matter of any combination of Examples 251-259. In this example, polarity inversion is due to polarity inversion of embedded high speed serial interface data lines within a computing device.

Example 261 includes an apparatus for receiving register access protocol messages. The apparatus includes a receiver to receive a single-ended one (SE1) signal, the SE1 signal indicating a RAP message follows the SE1 signal. The receiver is also configured to receive the RAP message. The apparatus further includes a register to be accessed based on the RAP message.

Example 262 incorporates the subject matter of Examiner 261. In this example, the SE1 is received from data lines comprising a pair of embedded high speed serial interface data lines comprising a positive embedded high speed serial interface data line (eD+) and a negative embedded high speed serial interface data line (eD−).

Example 263 incorporates the subject matter of any combination of Examples 261-262. In this example, the eD+ data line is to carry a clock signal for the RAP message, and the eD− data line is to carry instructions of the RAP message. The instructions of the RAP message include a read operation, a write operation, a clear operation, or any combination thereof.

Example 264 incorporates the subject matter of any combination of Examples 261-263. In this example, he SE1 signal is to be received at the apparatus from a RAP initiator.

Example 265 incorporates the subject matter of any combination of Examples 261-264. In this example, the SE1 signal is to be issued by a RAP initiator in a RAP receptor protocol.

Example 266 incorporates the subject matter of any combination of Examples 261-265. In this example, the apparatus is en embedded high speed serial interface repeater.

Example 267 incorporates the subject matter of any combination of Examples 261-266. In this example, following the RAP message a clock signal and a two-bit command message are received.

Example 268 incorporates the subject matter of any combination of Examples 261-267. In this example, the RAP message is related to power-on, idle, suspend state, connect, disconnect, reset, or any combination thereof.

Example 269 incorporates the subject matter of any combination of Examples 261-268. In this example, the SE1 signal is to be received in-band to an embedded high speed serial interface protocol.

Example 270 incorporates the subject matter of any combination of Examples 261-269. In this example, he RAP message includes a command message containing a clock and an indication of a type of operation to be performed at the register.

Example 271 describes an apparatus for explicit control message signaling. The apparatus includes a detector to detect an idle state on a pair of legacy Universal Serial Bus (USB) data lines communicatively coupled to the apparatus for a first predetermined period of time. The apparatus includes a receiver to receive a control message within a second predetermined period of time subsequent to the first predetermined period of time. The apparatus includes a controller to determine entry into either an idle state or a reset state.

Example 272 incorporates the subject matter of Example 271. In this example, to determine entry into either an idle state or a reset state, the controller is to remove voltage pull-downs at the apparatus and sample data transfer rate at the pair of legacy Universal Serial Bus (USB) data lines after the voltage pull-downs are removed. The controller is further configured to issue a digital ping if a state of the data lines has changed after removing the voltage pull-downs, and determine entry into either an idle state or a reset state based on whether a digital ping has been issued.

Example 273 incorporates the subject matter of any combination of Examples 271-272. In this example, the first predetermined period of time is between about 0 milliseconds and about 3 milliseconds.

Example 274 incorporates the subject matter of any combination of Examples 271-273. In this example, the second predetermined period of time between about 3 milliseconds and about 3.125 microseconds after initially detection of the idle state.

Example 275 incorporates the subject matter of any combination of Examples 271-274. In this example, an idle state is indicated when the line data line state remains unchanged after removing the voltage pull-downs.

Example 276 incorporates the subject matter of any combination of Examples 271-275. In this example, the apparatus comprises an embedded high speed serial interface repeater.

Example 277 incorporates the subject matter of any combination of Examples 271-276. In this example, entry into a reset state is indicated if no digital ping is issued by the apparatus.

Example 278 incorporates the subject matter of any combination of Examples 271-277. In this example, entry into an idle state is indicated if a digital ping is detected.

Example 279 incorporates the subject matter of any combination of Examples 271-278. In this example, the data lines are legacy USB data lines, and the control message is provided in band via the legacy USB data lines as opposed to via out-of-band signal lines.

Example 280 incorporates the subject matter of any combination of Examples 271-279. In this example, the apparatus comprises an embedded high speed serial interface repeater that is a peripheral embedded high speed serial interface repeater of a peripheral device.

Example 281 describes an apparatus for explicit control message signaling. The apparatus includes a receiver to receive a single-ended one (SE1), the SE1 indicating a register access protocol (RAP) message follows the SE1. The receiver is further configured to receive the RAP message. The RAP message includes data indicating one or more of a battery charging indication, an on-the-go indication, or any combination thereof.

Example 282 incorporates the subject matter of Example 281. In this example, the RAP data to transmit in the RAP message accesses registers of the connected device based on the RAP message.

Example 283 incorporates the subject matter of any combination of Examples 281-282. In this example, the RAP message further comprises Universal Serial Bus (USB) register indications.

Example 284 incorporates the subject matter of any combination of Examples 281-283. In this example, the receiver is a component of a peripheral device, wherein the battery charging indication comprises an indication of a charging type of the peripheral device.

Example 285 incorporates the subject matter of any combination of Examples 281-284. In this example, the charging type includes one or more of a dedicated charging device (DCD), a standard downstream port (SDP), and a charging downstream port (CDP).

Example 286 incorporates the subject matter of any combination of Examples 281-285. In this example, the on-the-go indication includes an indication of role the apparatus.

Example 287 incorporates the subject matter of any combination of Examples 281-286. In this example, the role of the apparatus includes a host computing device role, and/or a peripheral computing device role.

Example 288 incorporates the subject matter of any combination of Examples 281-287. In this example, the role of the apparatus may be changed dynamically based on changes of the on-the-go indication.

Example 289 incorporates the subject matter of any combination of Examples 281-288. In this example, battery charging indication detection occurs upon power up and before Universal Serial Bus operations.

Example 290 incorporates the subject matter of any combination of Examples 281-289. In this example, a battery charging indication detection is enabled during suspend state, idle, or any combination thereof.

Example 291 describes an apparatus for explicit control message signaling. The apparatus includes an embedded high speed serial interface initiator component to issue a single-ended one (SE1) on each of a pair of embedded high speed serial interface data lines. The apparatus further includes a receiver to receive an indication of whether an active window exists on either a positive embedded high speed serial interface data line or on a negative embedded high speed serial interface data line.

Example 292 incorporates the subject matter of Example 291. In this example, the embedded high speed serial interface initiator component is to issue a single-ended zero (SE0) on each of the embedded high speed serial interface data lines.

Example 293 incorporates the subject matter of any combination of Examples 291-292. In this example, if an active window exists on a positive embedded high speed serial interface data line, a device state is non-polarity inverted.

Example 294 incorporates the subject matter of any combination of Examples 291-293. In this example, the apparatus is to receive a digital ping on the positive embedded high speed serial interface data line.

Example 295 incorporates the subject matter of any combination of Examples 291-294. In this example, the apparatus is to receive the digital ping on from the positive embedded high speed serial interface data line at an embedded high speed serial interface port, and declare that no polarity inversion exists on the embedded high speed serial interface data lines.

Example 296 incorporates the subject matter of any combination of Examples 291-295. In this example, if an active window exists on a negative embedded high speed serial interface data line a device state is polarity inverted.

Example 297 incorporates the subject matter of any combination of Examples 291-296. In this example, the apparatus is to receive a digital ping on the negative embedded high speed serial interface data line.

Example 298 incorporates the subject matter of any combination of Examples 291-297. In this example, the apparatus is to receive the digital ping from the negative embedded high speed serial interface data line at an embedded high speed serial interface port, and declare that polarity inversion exists on the embedded high speed serial interface data lines.

Example 299 incorporates the subject matter of any combination of Examples 291-298. In this example, polarity inversion is due to polarity agnostic Universal Serial Bus plugs to be received by a computing device having the embedded high speed serial interface data lines.

Example 300 incorporates the subject matter of any combination of Examples 291-299. In this example, polarity inversion is due to polarity inversion of the embedded high speed serial interface data lines within a computing device.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for explicit control message signaling, comprising:
   a pair of embedded high speed serial interface data lines;
   a register of an embedded high speed serial interface component; and
   an embedded high speed serial interface port to:
      issue a single-ended one (SE1) signal on each of the pair of embedded high speed serial interface data lines, the SE1 indicating a register access protocol (RAP) message follows the SE1 signal; and
      access the register of the embedded high speed serial interface component based on the RAP message.

2. The system of claim 1, wherein the embedded high speed serial interface data lines comprise a positive embedded high speed serial interface data line (eD+) and a negative embedded high speed serial interface data line (eD−).

3. The system of claim 1, the embedded high speed serial interface port comprising a RAP initiator, wherein the SE1 signal is to be issued by the RAP initiator to a RAP receptor of the embedded high speed serial interface component, wherein the RAP initiator is communicatively coupled via the embedded high speed serial interface data lines to the embedded high speed serial interface component.

4. The system of claim 1, the embedded high speed serial interface component comprises an embedded high speed serial interface repeater, wherein the SE1 signal is to be issued by a RAP initiator of an embedded high speed serial interface port to a RAP receptor of the embedded high speed serial interface repeater.

5. The system of claim 1, wherein the embedded high speed serial interface port is a downstream port comprising a RAP initiator, wherein the RAP initiator is to issue the SE1 to a RAP receptor of the embedded high speed serial interface component comprising an upstream embedded high speed serial interface port.

6. The system of claim 1, wherein following the SE1 signal, the embedded high speed serial interface port is to forward a clock signal on a positive embedded high speed serial interface data line and forward a two-bit command message on a negative embedded high speed serial interface data line.

7. The system of claim 1, wherein RAP information is related to:
   power on;
   idle;
   suspend state
   connect;
   disconnect;
   reset; or
   any combination thereof.

8. The system of claim 1, wherein the SE1 signal is to be issued in-band to the embedded high speed serial interface protocol over differential embedded high speed serial interface data lines.

9. The system of claim 1, wherein the RAP message comprises a command message containing a clock and an indication of a type of operation to be performed at the register.

10. The system of claim 2, wherein the eD+ data line is to carry a clock signal for the RAP message, and the eD− data line is to carry instructions of the RAP message comprising:
    a read operation;
    a write operation;
    a clear operation; or
    any combination of the above.

11. A method for explicit control message signaling, comprising:
    issuing a single-ended one (SE1) signal on each of a pair of embedded high speed serial interface data lines, the SE1 indicating a register access protocol (RAP) message follows the SE1 signal; and accessing a register of an embedded high speed serial interface component based on the RAP message.

12. The method of claim 11, wherein the embedded high speed serial interface data lines comprise a positive embedded high speed serial interface data line (eD+) and a negative embedded high speed serial interface data line (eD−).

13. The method of claim 11, wherein the SE1 signal is issued by a RAP initiator to a RAP receptor of the embedded high speed serial interface component, wherein the RAP initiator is communicatively coupled via embedded high speed serial interface data lines to the embedded high speed serial interface component.

14. The method of claim 11, wherein the SE1 signal is issued by a RAP initiator of an embedded high speed serial interface port to a RAP receptor of the embedded high speed serial interface component comprising an embedded high speed serial interface repeater.

15. The method of claim 11, wherein SE1 is issued by a RAP initiator of a downstream embedded high speed serial interface port to a RAP receptor of the embedded high speed serial interface component comprising an upstream embedded high speed serial interface port.

16. The method of claim 11, wherein following the SE1 signal, the method comprises:
forwarding a clock signal is forwarded on a positive embedded high speed serial interface data line; and
forwarding a two-bit command message on a negative embedded high speed serial interface data line.

17. The method of claim 11, wherein RAP information is related to:
power on;
idle;
suspend state
connect;
disconnect;
reset; or
any combination thereof.

18. The method of claim 11, wherein the SE1 signal is issued in-band to the embedded high speed serial interface protocol over differential embedded high speed serial interface data lines.

19. The method of claim 11, wherein the RAP message comprises a command message containing a clock and an indication of a type of operation to be performed at the register.

20. The method of claim 12, wherein the eD+ data line carries a clock signal for the RAP message and the eD− data line carries instructions of the RAP message comprising:
a read operation;
a write operation;
a clear operation; or
any combination of the above.

21. A non-transitory computer readable medium including code, when executed, to cause a processing device to:
issue a single-ended one (SE1) signal on each of a pair of embedded high speed serial interface data lines, the SE1 indicating a register access protocol (RAP) message follows the SE1 signal; and
access a register of an embedded high speed serial interface component based on the RAP message.

22. An embedded high speed serial interface port, comprising a controller to issue:
a single-ended one (SE1) signal, the SE1 indicating a register access protocol (RAP) message follows the SE1 signal; and
a RAP message to access a register based on the RAP message.

23. The embedded high speed serial interface port of claim 22, wherein the embedded high speed serial interface port issues the SE1 on data lines comprising a pair of embedded high speed serial interface data lines comprising a positive embedded high speed serial interface data line (eD+) and a negative embedded high speed serial interface data line (eD−).

24. The embedded high speed serial interface port of claim 23, wherein the eD+ data line is to carry a clock signal for the RAP message, and the eD− data line is to carry instructions of the RAP message comprising:
a read operation;
a write operation;
a clear operation; or
any combination of the above.

25. The embedded high speed serial interface port of claim 22, further comprising a RAP initiator, wherein the SE1 signal is to be issued by the RAP initiator.

\* \* \* \* \*